United States Patent
Kamijo et al.

(10) Patent No.: US 8,274,254 B2
(45) Date of Patent: Sep. 25, 2012

(54) POWER TRANSMISSION CONTROL DEVICE, POWER TRANSMISSION DEVICE, POWER RECEIVING CONTROL DEVICE, POWER RECEIVING DEVICE, ELECTRONIC APPARATUS, METHOD FOR CONTROLLING POWER TRANSMISSION, AND METHOD FOR CONTROLLING POWER RECEIVING

(75) Inventors: Takahiro Kamijo, Fujimi-cho (JP); Yoichiro Kondo, Chino (JP); Kota Onishi, Nagoya (JP); Masayuki Kamiyama, Nagoya (JP); Nobutaka Shiozaki, Nagoya (JP); Kentaro Yoda, Chino (JP)

(73) Assignee: Seiko Epson Corporation, Tokyo (JP)

( * ) Notice: Subject to any disclaimer, the term of this patent is extended or adjusted under 35 U.S.C. 154(b) by 611 days.

(21) Appl. No.: 12/490,839

(22) Filed: Jun. 24, 2009

(65) Prior Publication Data

US 2009/0322281 A1 Dec. 31, 2009

(30) Foreign Application Priority Data

Jun. 25, 2008 (JP) ................................. 2008-165865
May 21, 2009 (JP) ................................. 2009-123142

(51) Int. Cl.
*H02J 7/00* (2006.01)

(52) U.S. Cl. ...................................................... 320/108

(58) Field of Classification Search .................... 320/108
See application file for complete search history.

(56) References Cited

U.S. PATENT DOCUMENTS 7,233,137 B2 6/2007 Nakamura et al.
2005/0068019 A1* 3/2005 Nakamura et al. ............ 323/355

FOREIGN PATENT DOCUMENTS

| JP | A-10-94199 | 4/1998 |
| JP | A-2005-110412 | 4/2005 |
| JP | A-2006-60909 | 3/2006 |
| JP | A-2008-206233 | 9/2008 |
| JP | A-2008-206327 | 9/2008 |

* cited by examiner

*Primary Examiner* — Arun Williams
(74) *Attorney, Agent, or Firm* — Oliff & Berridge, PLC

(57) ABSTRACT

A power transmission control device included in a contactless power transmission system that transmits power by electromagnetically coupling a primary coil and a secondary coil from a power transmission device to a power receiving device so as to supply the power to a load of the power receiving device includes: a controller that controls the power transmission device. The controller includes: a negotiation processing section that performs a negotiation process of contactless power transmission; and a setup processing section that performs a setup process of the contactless power transmission based on a result of the negotiation process. In the device, normal power transmission from the power transmission device to the power receiving device is started after the setup process.

36 Claims, 17 Drawing Sheets

FIG. 5A

NEGOTIATION FRAME

| START FIELD | INFORMATION FIELD | END FIELD |
|---|---|---|
| | HARDWARE INFORMATION CODE / MATCHING CODE | |

FIG. 5B

MATCHING CODE

| COMMAND ID | COIL CODE (CLASSIFICATION CODE, COIL ID) | EXTENSION CODE | STANDARD CODE |

FIG. 5C

HARDWARE INFORMATION CODE

| HARDWARE INFORMATION | |
|---|---|
| THRESHOLD OF FOREIGN OBJECT | SYSTEM CODE (SYSTEM INFORMATION) |

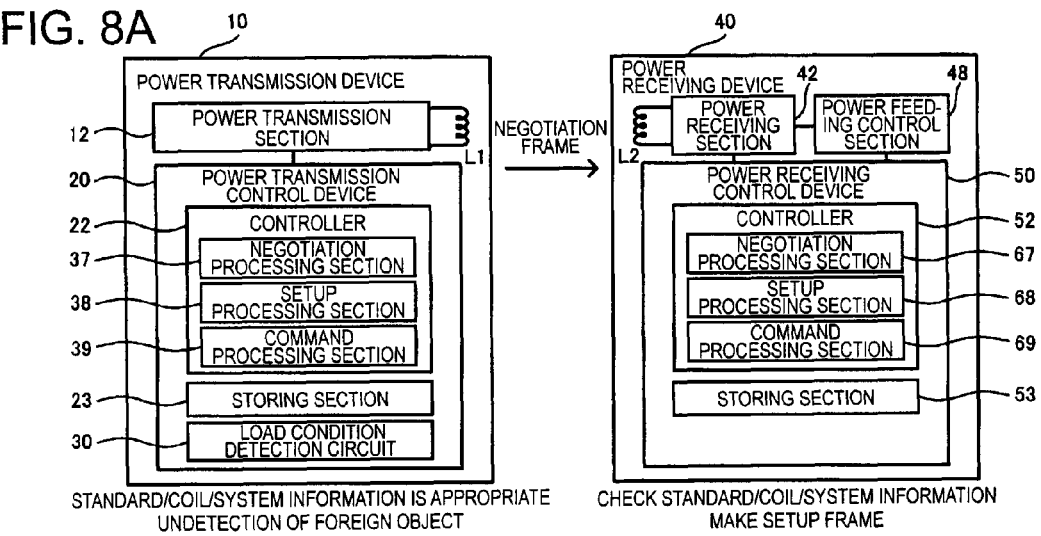
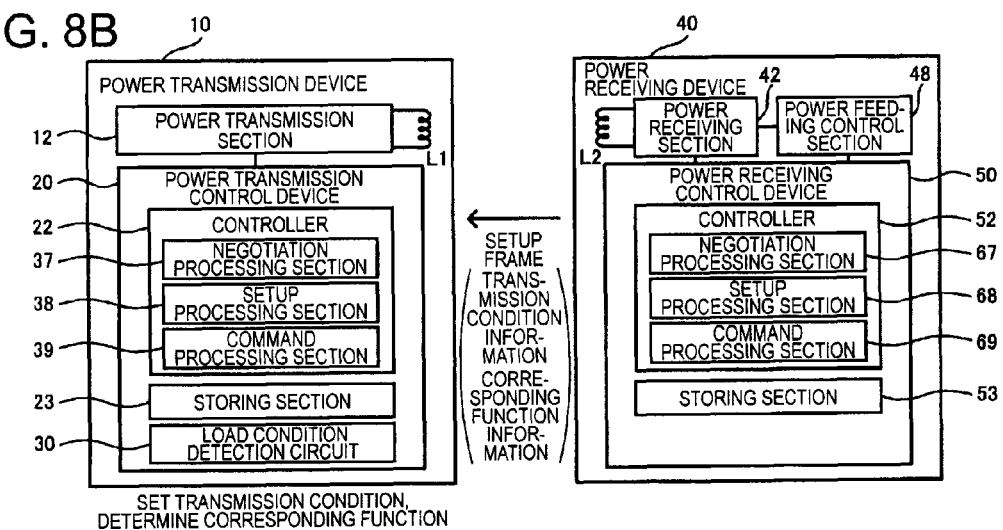
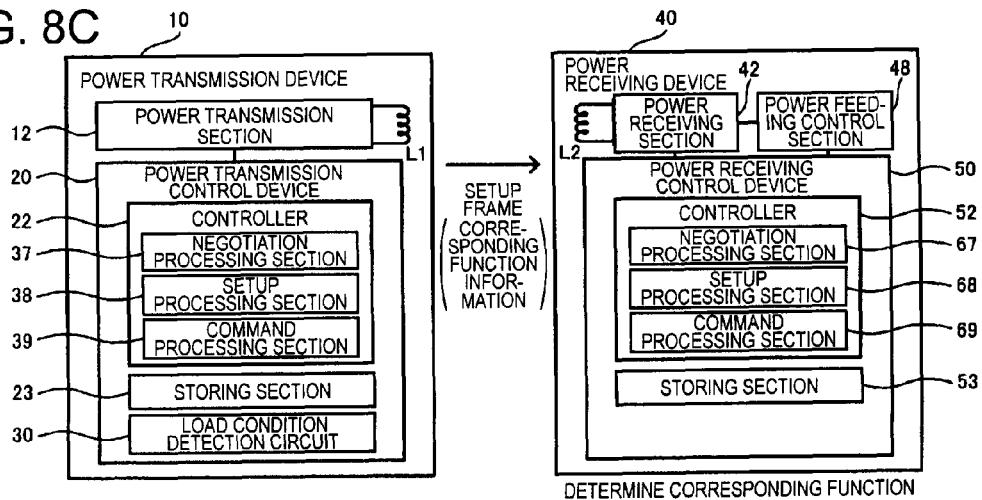

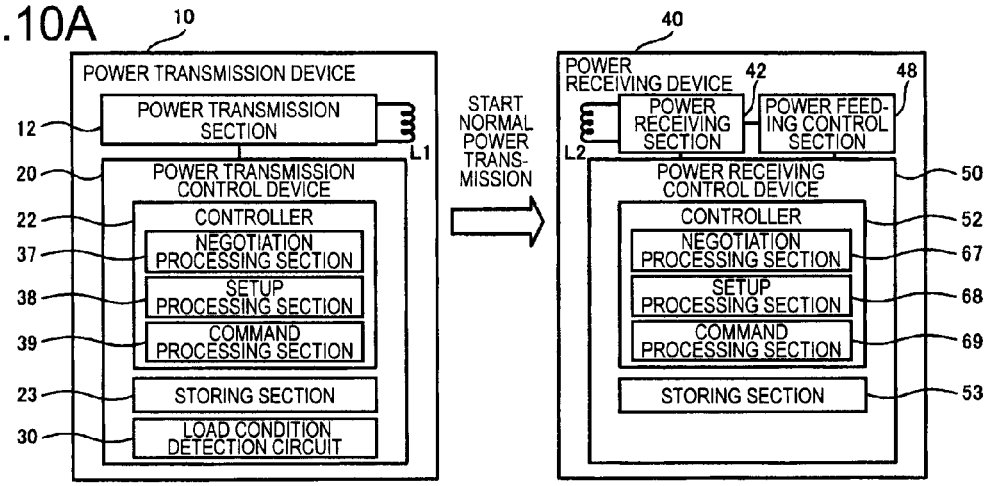
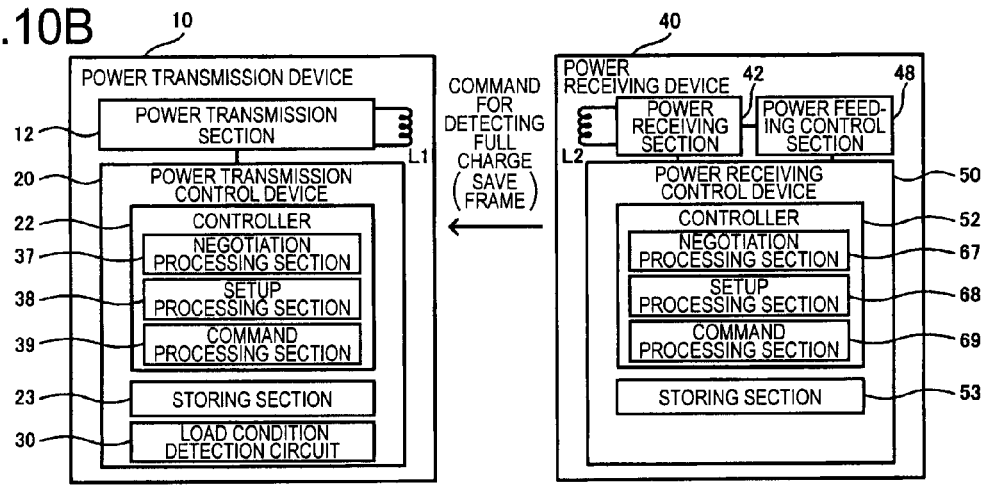
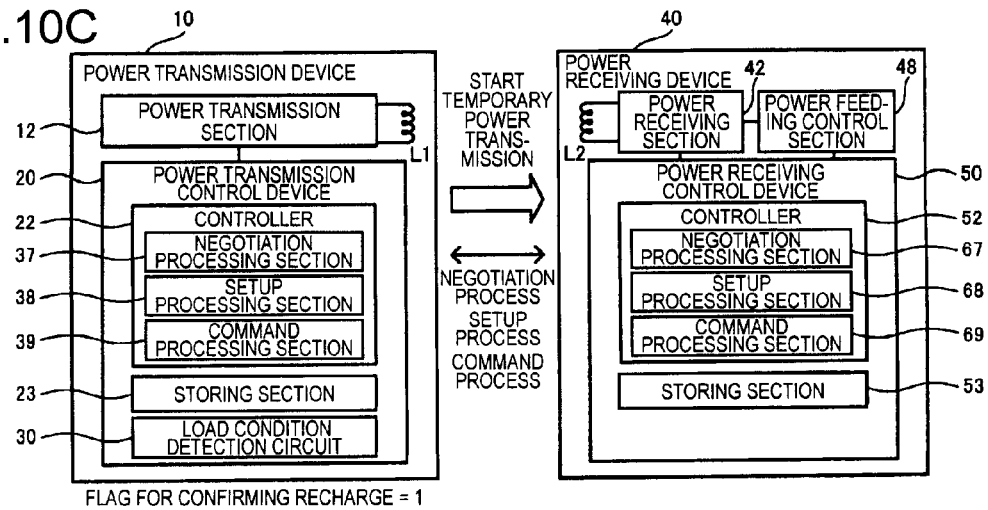

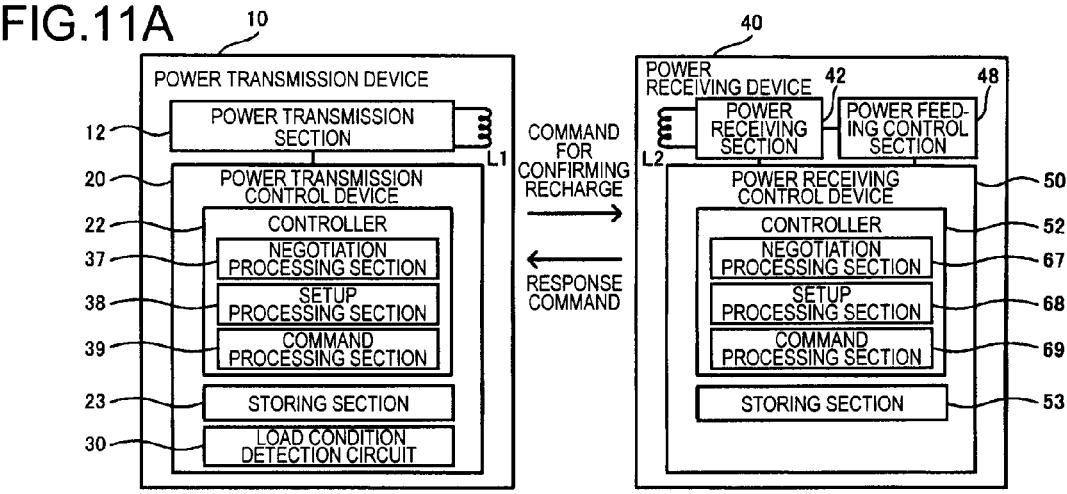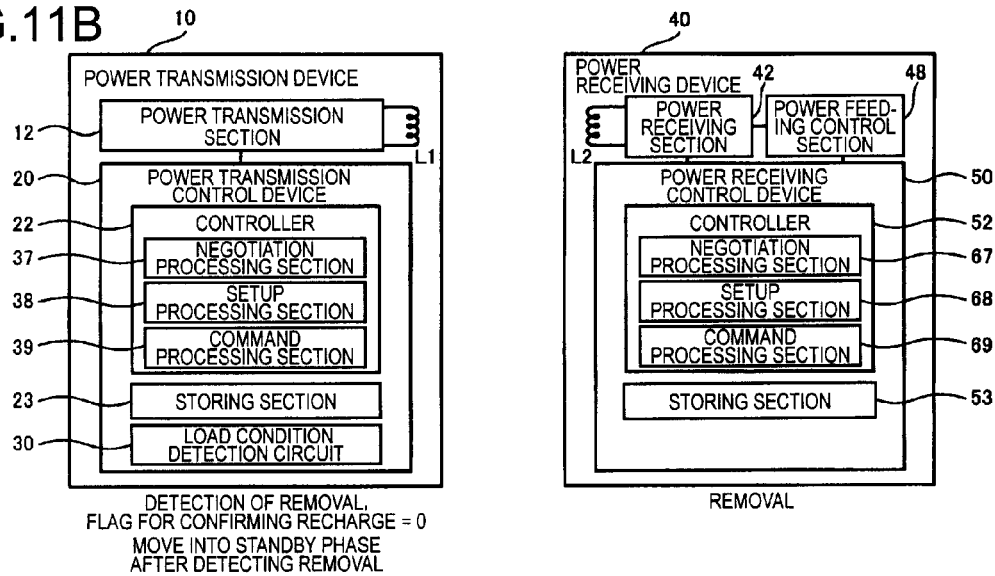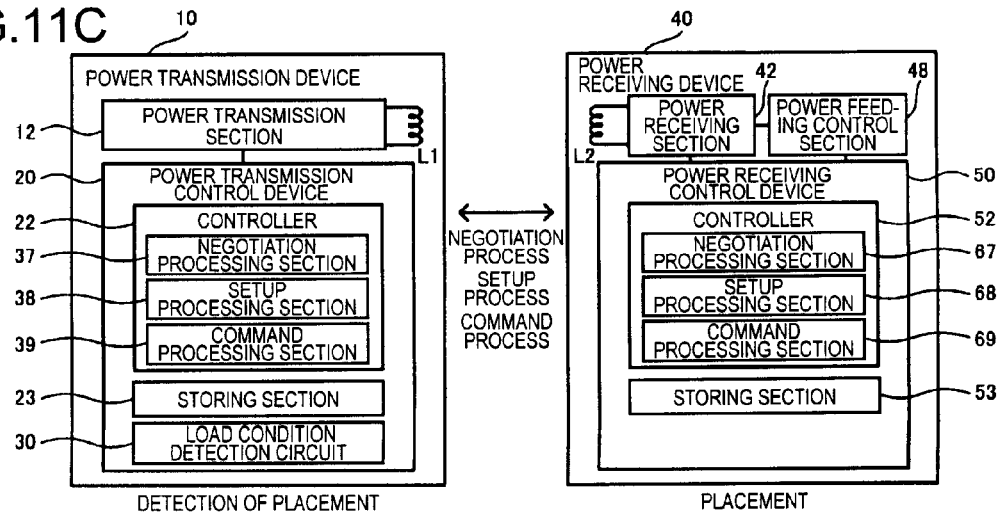

POWER TRANSMISSION CONTROL DEVICE, POWER TRANSMISSION DEVICE, POWER RECEIVING CONTROL DEVICE, POWER RECEIVING DEVICE, ELECTRONIC APPARATUS, METHOD FOR CONTROLLING POWER TRANSMISSION, AND METHOD FOR CONTROLLING POWER RECEIVING

This application claims priority to JP 2008-165865 filed in Japan on Jun. 25, 2008 and to JP 2009-123142 filed in Japan on May 21, 2009, the entire disclosures of which are hereby incorporated by reference in their entireties.

BACKGROUND

1. Technical Field

The present invention relates to a power transmission control device, a power transmission device, a power receiving control device, a power receiving device, an electronic apparatus, a method for controlling power transmission, and a method for controlling power receiving.

2. Related Art

In resent years, contactless power transmission (non-contact power transmission) has been highlighted. The contactless power transmission makes it possible to perform transmission of electric power by utilizing electromagnetic induction without using a metallic contact. As an example of the contactless power transmission, charging cell phones and household equipment (e.g., cordless handsets of telephones) are suggested.

JP-A-2006-60909 is a first example of related art of the contactless power transmission. In the first example, an ID authentication is realized by transmitting and receiving an authentication code between a power receiving device (a secondary side) and a power transmission device (a primary side) so as to detect insertion of a foreign object. JP-A-10-94199 is a second example of related art. In the second example, a power supply control system is disclosed such that in order to prevent a circuit breaker from tripping in a case where electrical appliances are simultaneously used at home, power usage information of the electrical appliances is gathered so as to determine whether or not power can be supplied within the acceptable range. Then, the power consumption is allowed to the electrical appliance that is determined to be eligible for the power consumption.

However, in the first example, the power transmission device does not determine whether or not the coil ID received from the power receiving device is appropriate. Therefore, in a case where a plurality of the power receiving device is mixedly exist, appropriate contactless power transmission cannot be realized.

As described above, in the example of related art, since the power transmission device does not determine whether or not the coil ID received from the power receiving device is appropriate, functions and the like of the power receiving device are not determined. As a result, appropriate contactless power transmission cannot be realized.

SUMMARY

An advantage of the invention is to provide a power transmission control device, a power transmission device, a power receiving control device, a power receiving device, an electronic apparatus, a method for controlling power transmission, and a method for controlling power receiving that are capable of realizing an appropriate and efficient process sequence.

According to a first aspect of the invention, a power transmission control device included in a contactless power transmission system that transmits power by electromagnetically coupling a primary coil and a secondary coil from a power transmission device to a power receiving device so as to supply the power to a load of the power receiving device includes a controller that controls the power transmission device. The controller includes: a negotiation processing section that performs a negotiation process of contactless power transmission; and a setup processing section that performs a setup process of the contactless power transmission based on a result of the negotiation process. In the device, normal power transmission from the power transmission device to the power receiving device is started after the setup process.

According to the invention, the negotiation process of the contactless power transmission is performed so that various settings are made. Thereafter, the setup process is performed based on a result of the negotiation process so that various setups are made. Then, the normal power transmission from the power transmission device to the power receiving device is started. Accordingly, the minimum basic setting for realizing appropriate contactless power transmission is made in the negotiation process, and the setup of different setup information for each application is made in the setup process. Thus, the power transmission control device that is capable of realizing an appropriate and efficient process sequence can be provided.

In the invention, the controller may further include a command processing section that performs a command process of the contactless power transmission after the setup process; and the normal power transmission from the power transmission device to the power receiving device is started by the command process.

Accordingly, after the setup of various different setup information for each application is made, various commands required for the contactless power transmission are executed by the setup process so that the normal power transmission can be started.

In the invention, the command processing section may process a command for starting normal power transmission after the setup process.

Accordingly, starting the normal power transmission with the command for starting normal power transmission can be realized.

In the invention, the command processing section may process a command for detecting a full charge of a battery included in the load of the power receiving device or a command for confirming a recharge of the battery after the setup process.

Accordingly, a notice of a full charge with the command for detecting a full charge or a confirmation of a recharge after detecting the full charge with the command for confirming a recharge can be realized.

In the invention, the negotiation process section may perform a confirmation process that confirms whether or not information can be communicated with the power receiving device, and a confirmation process that confirms whether or not communicated information is adequate.

Accordingly, whether or not information can be communicated with the power receiving device and whether or not the communicated information is adequate can be confirmed in the negotiation process which is performed at early stage of the setup process.

In the invention, the negotiation processing section may perform a confirmation process that confirms whether or not the load of the power receiving device is appropriate.

Accordingly, the load of the power receiving device can be confirmed before the setup process.

In the invention, the negotiation processing section may perform a checking process that checks standard information, coil information, and system information with the power receiving device. The system information shows a method for detecting a load condition.

Accordingly, various processes can be performed based on a result of the checking process of standard/coil/system information of the power receiving side and that of the power transmission side.

In the invention, a transmission condition of the contactless power transmission may be set in the setup processing section based on a result of the negotiation process.

Accordingly, different power transmission conditions for each apparatus and the like are set in the setup process so as to perform the contactless power transmission.

In the invention, if the power receiving device transmits transmission condition information of the contactless power transmission, the setup process section may receive the transmission condition information so as to set a transmission condition of the contactless power transmission.

Accordingly, since a transmission condition of the contactless power transmission can be set based on the transmission condition information from the power receiving side, in various combinations of the primary side and the secondary side, an appropriate transmission condition can be set.

In the invention, information on a corresponding function may be exchanged in the setup processing section.

Accordingly, different information on a corresponding function for each application or apparatuses can be exchanged.

In the invention, after the normal power transmission from the power transmission device to the power receiving device is started, the controller may stop the normal power transmission if the power receiving device requests a power transmission stop.

Accordingly, the normal power transmission is stopped if the power receiving device requests the power transmission stop.

In the invention, after the normal power transmission from the power transmission device to the power receiving device is started, the controller may stop the normal power transmission if a full charge of a battery included in the load of the power receiving device is detected.

Accordingly, since the normal power transmission to the power receiving side is stopped after detecting the full charge, the wasteful power consumption after detecting the full charge can be suppressed.

In the invention, the controller may move into a standby phase after detecting the full charge if the normal power transmission is stopped by detecting the full charge.

Accordingly, the power transmission side can be moved into the standby phase after detecting the full charge.

In the invention, the controller may confirm a recharge of the battery in the standby phase after detecting the full charge.

Accordingly, a recharge of the battery can be confirmed as needed after detecting the full charge.

In the invention, the controller may maintain a flag for confirming a recharge in a set state without clearing the flag in the standby phase after detecting the full charge.

Accordingly, the command for confirming a recharge can be executed by the flag for confirming a recharge maintained in the set state.

In the invention, if a removal of an electronic apparatus of the power receiving side is detected in the standby phase after detecting the full charge, the controller may move into a standby phase after detecting the removal.

Accordingly, if a removal of the electric apparatus of the power receiving side is detected after detecting the full charge, the controller may move into a standby phase after detecting the removal in which the controller stands by until the electronic apparatus of the power receiving device to be placed.

In the invention, if a placement of the electronic apparatus of the power receiving side is detected in the standby phase after detecting the removal, the controller may move into a phase of the negotiation process.

Accordingly, if a placement is detected in the standby phase after detecting the removal, the normal power transmission can be started after going through the negotiation process and the setup process and the like.

According to a second aspect of the invention, a power transmission device includes: the power transmission control device of the first aspect; and a power transmission section that generates an alternate current voltage so as to supply the voltage to the primary coil.

According to a third aspect of the invention, an electronic apparatus includes: the power transmission device according to the second aspect.

According to a fourth aspect of the invention, a power receiving control device included in a contactless power transmission system that transmits power by electromagnetically coupling a primary coil and a secondary coil from a power transmission device to a power receiving device so as to supply the power to a load of the power receiving device includes a controller that controls the power receiving device. The controller includes: a negotiation processing section that performs a negotiation process of contactless power transmission; and a setup processing section that performs a setup process of the contactless power transmission based on a result of the negotiation process. In the device, if normal power transmission from the power transmission device to the power receiving device is started after the setup process, power supply to the load is started.

According to the invention, the negotiation process of the contactless power transmission is performed so that various settings are made. Thereafter, the setup process is performed based on a result of the negotiation process so that various setups are made. Then, power supply to the load is started. Accordingly, the minimum basic setting for realizing appropriate contactless power transmission is made in the negotiation process, and the setup of the different setup information for each application is made in the setup process. Thus, the power receiving control device that is capable of realizing an appropriate and efficient process sequence can be provided.

In the invention, the controller may further include a command processing section that performs a command process of the contactless power transmission after the setup process. In the device, the power supply to the load is started if the normal transmission from the power transmission device to the power receiving device is started by the command process.

Accordingly, after the setup of various different setup information for each application is made, various commands required for the contactless power transmission are executed by the setup process.

In the invention, the command processing section may process a command for starting normal power transmission after the setup process.

Accordingly, starting the normal power transmission with the command for starting normal power transmission can be realized.

In the invention, the command processing section may process the command for detecting a full charge of a battery included in the load of the power receiving device or the command for confirming a recharge of the battery.

Accordingly, a notice of a full charge with the command for detecting a full charge or a confirmation of a recharge after detecting the full charge with the command for confirming a recharge can be realized.

In the invention, the negotiation process section may perform a confirmation process that confirms whether or not information can be communicated with the power receiving device, and a confirmation process that confirms whether or not communicated information is adequate.

Accordingly, whether or not information can be communicated with the power transmission device and whether or not communicated information is adequate can be confirmed in the negotiation process which is performed at early stage of the setup process.

In the invention, the negotiation processing section may perform a checking process that checks standard information, coil information, and system information with the power transmission device. The system information shows a method for detecting a load condition.

Accordingly, various processes can be performed based on a result of the checking process of standard/coil/system information of the power receiving side and that of the power transmission side.

In the invention, transmission condition information of the contactless power transmission may be transmitted in the setup processing section based on a result of the negotiation process.

Accordingly, the different power transmission conditions for each apparatus and the like are set in the setup process so as to perform contactless power transmission.

In the invention, information on a corresponding function may be exchanged in the setup processing section.

Accordingly, different information on the corresponding function for each application or apparatus can be exchanged.

According to a fifth aspect of the invention, a power receiving device includes: the power receiving control device according to the fourth aspect; and a power receiving section that converts an induced voltage of the secondary coil into an alternate current voltage.

According to a sixth aspect of the invention, an electronic apparatus includes: the power receiving device according to the fifth aspect; and a load to which power is supplied by the power receiving device.

According to a seventh aspect of the invention, a method for controlling power transmission in a contactless power transmission system that transmits power by electromagnetically coupling a first coil and a second coil from a power transmission device to a power receiving device so as to supply the power to a load of the power receiving device includes: performing a negotiation process of contactless power transmission; and performing a setup process of the contactless power transmission based on a result of the negotiation process so as to start normal power transmission from the power transmission device to the power receiving device after the setup process.

According to an eighth aspect of the invention, a method for controlling power receiving in a contactless power transmission system that transmits power by electromagnetically coupling a first coil and a second coil from a power transmission device to a power receiving device so as to supply the power to a load of the power receiving device includes: performing a negotiation process of contactless power transmission; and performing a setup process of the contactless power transmission based on a result of the negotiation process. In the method, power supply to the load is started if normal power transmission from the power transmission device to the power receiving device is started before the setup process.

The negotiation process may be at least one of: a confirmation process that confirms whether or not information is able to be communicated between the power transmission device and the power receiving device; a confirmation process that confirms whether or not the communicated information is adequate; a confirmation process that confirms whether or not the load of the power receiving device is appropriate; a checking process that checks standard information or coil information between the power transmission device and the power receiving device; and a checking process that checks system information of the power transmission device, the information showing a method for detecting a load condition, with system information of the power receiving device.

The setup process may be at least one of: a process in which a transmission condition of the power is set based on a result of the negotiation process; and a process in which information on a corresponding function between the power transmission device and the power receiving device is exchanged. Performing the negotiation process and the setup process allows an appropriate and efficient process sequence to be realized.

In the command process, a command that is confirmed to be available by at least one of the negotiation process and the setup process, may be issued and/or executed.

The command may be at least one of: a command for starting the normal power transmission; a command for detecting a full charge of a battery included in the load; and a command for confirming whether or not a recharge of the battery is required. In addition to the negotiation process and the setup process, performing the command process allows more appropriate and efficient process sequence to be realized.

BRIEF DESCRIPTION OF THE DRAWINGS

The invention will be described with reference to the accompanying drawings, wherein like numbers reference like elements.

FIGS. 5A, 5B, and 5C are format examples of a negotiation frame.

FIGS. 8A, 8B, and 8C are schematic views explaining the operation of the embodiment.

FIGS. 10A, 10B, and 10C are schematic views explaining the operation of the embodiment.

FIGS. 11A, 11B, and 11C are schematic views explaining the operation of the embodiment.

DETAILED DESCRIPTION OF EMBODIMENTS

Embodiments of the invention will be described in detail below. The embodiments explained below do not unduly limit the contents of the present invention described in the claims and all of the configurations explained in the embodiments are not indispensable to the means to solve the problem of the invention.

Electronic Apparatus

Figure 1A:
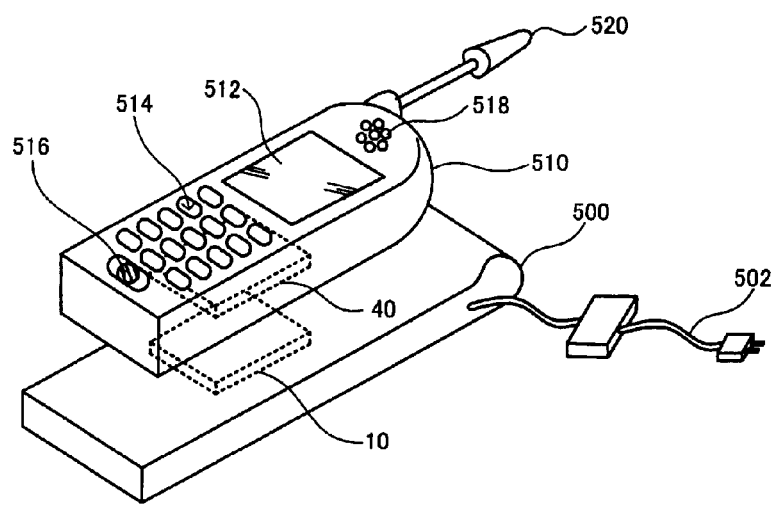
FIGS. 1A, 1B, and 1C are schematic views explaining contactless power transmission.

FIG. 1A shows an example of an electronic apparatus employing a method for contactless power transmission according to the embodiment. A charger 500 (a cradle) that is one of electronic apparatuses includes a power transmission device 10. A cell phone 510 that is one of electronic apparatuses includes a power receiving device 40. Further, the cell phone 510 includes a display 512 such as an LCD, an operation section 514 composed of buttons and the like, a microphone 516 (a voice input section), a speaker 518 (a voice output section), and an antenna 520.

Power is supplied to the charger 500 through an AC adapter 502, and the power is transmitted from the power transmission device 10 to the power receiving device 40 by contactless power transmission. Accordingly, a battery of the cell phone 510 can be charged and a device in the cell phone 510 can be operated.

The electronic apparatus according to the embodiment is not limited to the cell phone 510. The embodiment is applicable to various electronic apparatuses such as a watch, a cordless phone, a shaver, an electric toothbrush, a wrist computer, a handheld terminal, a personal digital assistant, an electric bicycle, or an IC card.

Figure 1B:
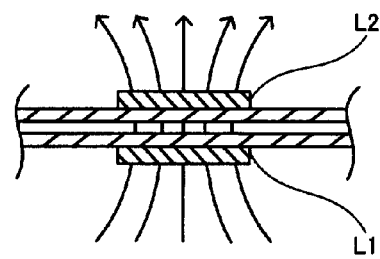

As schematically shown in FIG. 1B, power transmission from the power transmission device 10 to the power receiving device 40 is transmitted by electromagnetically coupling a primary coil L1 (a power transmission coil) used on the power transmission device 10 side and a secondary coil L2 (a power receiving coil) used on the power receiving device 40 side and thus forming a power transmission transformer. This realizes contactless power transmission.

In FIG. 1B, the primary coil L1 and the secondary coil L2 are, for example, a flat coil having an air-core formed by winding a coil wire in a spiral manner on a plane. The coil of the embodiment is not limited to this. Any coil can be employed regardless of its shape, structure, and the like as long as one can transmit power by electromagnetically coupling the primary coil L1 and the secondary coil L2.

Figure 1C:
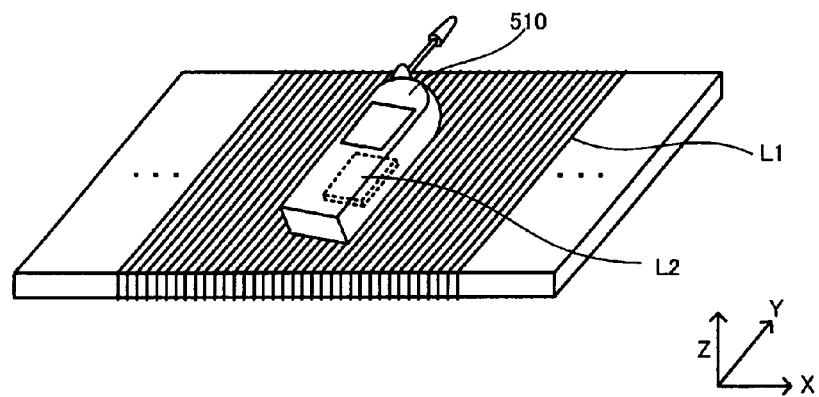

For example, in FIG. 1C, the primary coil L1 is formed by winding a coil wire in a spiral manner about an X axis with respect to a magnetic substance core. The secondary coil L2 provided in the cell phone 510 is similarly formed. The embodiment is also applicable to the coil shown in FIG. 1C.

Further, in FIG. 1C, as the primary coil L1 and the secondary coil L2, in addition to the coil formed by winding a coil wire about the X axis, a coil formed by winding a coil wire about a Y axis may be combined.

Power Transmission Device and Power Receiving Device

Figure 2:
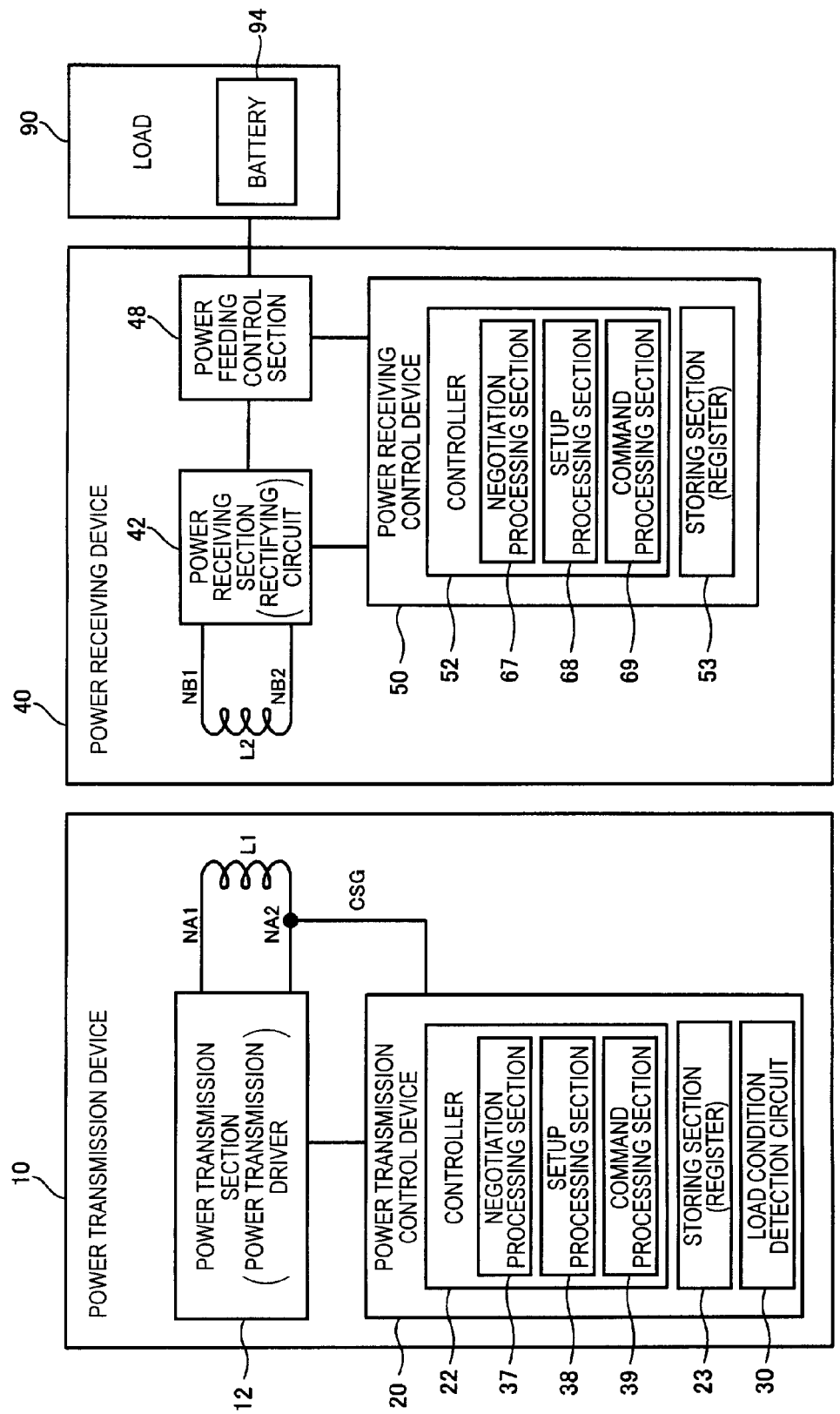
FIG. 2 is a structural example of a power transmission device, a power transmission control device, a power receiving device, and a power receiving control device according to an embodiment.

FIG. 2 shows a structural example of the power transmission device 10, a power transmission control device 20, the power receiving device 40, and a power receiving control device 50 according to the embodiment. The electronic apparatus used on a power transmission side such as the charger 500 shown in FIG. 1A includes the power transmission device 10 shown in FIG. 2. The electronic apparatus used on a power receiving side such as the cell phone 510 may include the power receiving device 40 and a load 90. According to a structure shown in FIG. 2, for example, by transmitting power from the power transmission device 10 to the power receiving device 40 by electromagnetically coupling the primary coil L1 and the secondary coil L2, a contactless power transmission (non-contact power transmission) system that supplies the power to the load 90 is realized.

The power transmission device 10 (a power transmission module, a primary module) may include the primary coil L1, a power transmission section 12, and the power transmission control device 20. The structure of the power transmission device 10 and the power transmission control device 20 is not limited to that shown in FIG. 2, and various modifications, such as omitting a part of the components (e.g. the primary coil), adding another component (e.g. a waveform monitor circuit), or changing connections, can be made.

The power transmission section 12 generates an alternate current voltage, and supplies it to the primary coil L1. Specifically, the power transmission section 12 generates an alternate current voltage in a predetermined frequency while transmitting power and an alternate current voltage having a frequency varied corresponding to data while transmitting the data so as to supply them to the primary coil L1. The power transmission section 12 may include, for example, a first power transmission driver for driving one end of the primary coil L1, a second power transmission driver for driving the other end of the primary coil L1, and at least one capacitor forming a resonance circuit together with the primary coil L1. Each of the first and the second power transmission drivers provided in the power transmission section 12 is an inverter circuit (a buffer circuit) composed of, for example, a power MOS transistor, and is controlled by the power transmission control device 20.

The primary coil L1 (the coil used on the power transmission side) and the secondary coil L2 (the coil used on the power receiving side) are electromagnetically coupled so as to form a power transmission transformer. For example, when power transmission is required, as shown in FIGS. 1A and 1B, the cell phone 510 is placed on the charger 500 so that magnetic flux of the primary coil L1 passes through the secondary coil L2. On the other hand, when power transmission is not required, the cell phone 510 is physically separated from the charger 500 so that the magnetic flux of the primary coil L1 does not pass through the secondary coil L2.

The power transmission control device 20 performs various controls of the power transmission device 10, and can be realized by an integrated circuit device (an IC). The power transmission control device 20 may include a controller 22, a storing section 23, and a load condition detection circuit 30. Further, modifications, such as omitting a part of the components or adding another component, can be made.

The controller 22 (the power transmission side) controls the power transmission device 10 and the power transmission control device 20. The controller 22 can be realized by an ASIC circuit such as a gate array, a micro computer with a program operates on the micro computer, and the like. The controller 22 controls power transmission by using the power transmission section 12, storage of the storing section 23, and the load condition detection circuit 30. Specifically, the controller 22 controls various sequences and performs determination processes required for power transmission, load condition detection (data detection, foreign object detection, removal detection, and the like), a frequency modulation, and the like.

The storing section 23 (a register) stores various information, and can be realized by, for example, a RAM, a D flip-flop, or a nonvolatile memory such as a flush memory and a mask ROM.

The load condition detection circuit 30 (a waveform detection circuit) detects a load condition of the power receiving side (the power receiving device or a foreign object). Detection of a load condition can be realized by detecting a variation of the waveform of an induced voltage signal (a coil terminal signal) of the primary coil L1. For example, in accordance with a variation of a load condition (a load current) of the power receiving side (the secondary side), a waveform of the induced voltage signal changes. The load condition detection circuit 30 detects the variation of the waveform, and outputs a detection result (detection result information) to the controller 22. Then, the controller 22, based on the detection information of the load condition in the load condition detection circuit 30, determines a load condition (a load variation, a degree of the load) of the power receiving side (the secondary side).

The power receiving device 40 (a power receiving module, a secondary module) may include the secondary coil L2, a power receiving section 42, a power feeding control section 48, and the power receiving control device 50. The structure of the power receiving device 40 and the power receiving control device 50 is not limited to that shown in FIG. 2, and various modifications, such as omitting a part of the components (e.g. the secondary coil), adding another component (e.g. a load modulation section), or changing connections, can be made.

The power receiving section 42 converts an alternating induced voltage signal of the secondary coil L2 into a direct current voltage. The conversion can be realized by a rectifying circuit included in the power receiving section 42.

The power feeding control section 48 controls power feeding to the load 90. That is, the power feeding control section 48 controls turning on/off of the power feeding to the load 90. Specifically, a level of the direct current voltage from the power receiving section 42 (a rectifying circuit) is adjusted so as to generate a power supply voltage. Thereafter, the power supply voltage is supplied to the load 90 so as to charge a battery 94 of the load 90. The load 90 may not include the battery 94.

The power receiving control device 50 performs various controls of the power receiving device 40, and can be realized by an integrated circuit device (an IC). The power receiving control device 50 operates with a power supply voltage generated from the induced voltage of the secondary coil L2. The power receiving control device 50 may include a controller 52 and a storing section 53.

The controller 52 (the power receiving side) controls the power receiving device 40 and the power receiving control device 50. The controller 52 can be realized by an ASIC circuit such as a gate array, a micro computer with a program operates on the micro computer, and the like. The controller 52 controls the power feeding control section 48 and storage of the storing section 53. Specifically, the controller 52 controls various sequences and performs determination processes required for position detection, frequency detection, a load modulation, full charge detection, and the like.

The storing section 53 (a register) stores various information, and can be realized by, for example, a RAM, a D flip-flop, or a nonvolatile memory such as a flush memory and a mask ROM.

In the embodiment, the controller 22 of the power transmission side includes a negotiation processing section 37, a setup processing section 38, and a command processing section 39. Further, the controller 52 of the power receiving side includes a negotiation processing section 67, a setup processing section 68, and a command processing section 69. The command processing sections 39 and 69 may not be included in the power transmission side and the power receiving side.

The negotiation process according to the embodiment is a confirmation process that confirms whether or not information can be communicated between the power transmission device and the power receiving device, a confirmation process that confirms whether or not communicated information is adequate, a confirmation process that confirms whether or not a load condition of the power receiving device side is appropriate, a checking process that checks standard information or coil information between the power transmission device and the power receiving device, and a checking process that checks system information of the power transmission device with system information of the power receiving device, and the like. The system information of the power transmission device shows a method for detecting a load condition.

The negotiation processing sections 37 and 67 perform a negotiation process of contactless power transmission. That is, between the power transmission side and the power receiving side, information on the basic setup of contactless power transmission (a standard, a coil, a system, a safety feature, and the like) is exchanged. The setup processing sections 38 and 68, based on a result of the negotiation process, perform a setup process of contactless power transmission. That is, after the basic setup of contactless power transmission is made in the negotiation process, different setup information for each apparatus and application is exchanged between the power transmission side and the power receiving side. The command processing sections 39 and 69 perform a command process of contactless power transmission after the setup process. That is, a basic command and a command that becomes available in the setup process are issued and executed. After the setup process, the controller 22 may start normal power transmission without going through the command process. For example, without the explicit issue of a command, the normal power transmission may be started after the setup process.

Specifically, the negotiation process section 37 of the power transmission side performs a confirmation process that confirms whether or not information can be communicated between the power receiving device 40, a confirmation process that confirms whether or not communicated information is adequate, and a confirmation process that confirms whether or not a load condition of the power receiving side is appropriate. That is, in the negotiation process, the follows are confirmed: whether or not information can be appropriately received from the power receiving side; whether or not the information received from the power receiving side is assumed appropriate information; and whether the power receiving side is not a foreign object but an appropriate power receiving device (a load). In addition, a load condition of the power receiving side may not be confirmed in the negotiation process.

More specifically, the negotiation processing section 37 performs a checking process that checks standard information, coil information, and system information with the power receiving device 40. The system information shows a method for detecting a load condition. That is, the standard/coil/system information received from the power receiving side is checked with that of the power transmission side so as to confirm whether or not the information is matched.

The setup process according to the embodiment is a process in which a transmission condition of the power is set based on a result of the negotiation process, a process in which information on a corresponding function between the power transmission device and the power receiving device is exchanged, and the like.

The setup processing section 38, based on a result of the negotiation process, sets a transmission condition of contactless power transmission. Specifically, when the power receiving device 40 transmits transmission condition information of contactless power transmission, the setup processing section 38 receives the transmission condition information so as to set transmission condition information of contactless power transmission. That is, when the power receiving device 40 transmits transmission condition information required for the normal power transmission such as a driving voltage of a coil and a driving frequency of the coil, based on the transmission condition information, the setup processing section 38 sets a transmission condition such as a driving voltage and a driving frequency. Further, different setup information for each apparatus and application is exchanged with the power receiving device 40.

The command process according to the embodiment is a process in which a command that is confirmed to be available is issued and/or executed by at least one of the negotiation process and the setup process. In addition, the command includes a command for staring normal power transmission, a command for detecting a full charge of a battery included in the load, a command for confirming whether or not a recharge of the battery is required, and the like.

After the setup process, the command processing section 39 processes various commands such as the command for starting normal power transmission, the command for detecting a full charge of the battery 94 (a command for notifying a full charge), and the command for confirming a recharge of the battery 94. That is, the command processing section 39 issues and executes these commands. As the command, at least the command for starting normal power transmission is prepared. Other commands can be treated as optional commands.

After the normal power transmission from the power transmission device 10 to the power receiving device 40 is started, the controller 22 stops the normal power transmission when requested by the power receiving device 40. For example, when a full charge of the battery 94 is detected after starting the normal power transmission, the normal power transmission is stopped. Specifically, the power receiving side detects a full charge of the battery 94, and transmits the command for detecting a full charge. When the controller 22 receives the command for detecting a full charge, the normal power transmission started with the command for starting normal power transmission is stopped.

If the normal power transmission is stopped by detecting the full charge, the controller 22 moves into a standby phase after detecting the full charge. That is, after detecting the full charge of the battery 94, the controller 22 stands by until a recharge of the battery 94 is required. At this time, since the normal power transmission from the power transmission side is stopped, a power supply voltage is not supplied to the power receiving device 40. Thus, the power receiving device 40 becomes a reset state.

The controller 22 confirms a recharge of the battery in the standby phase after detecting the full charge. That is, for example, temporary power transmission is carried out for each predetermined period so as to awake the reset state of the power receiving device 40. Then, the command for confirming a recharge is issued so as to confirm whether or not a recharge of the battery 94 is required. At this time, in the standby phase after detecting the full charge, a flag for confirming a recharge is maintained in a set state without being cleared. That is, setting the flag for confirming a recharge in the set state allows the command for confirming a recharge to be executed at a command branch after a negotiation phase and a setup phase.

On the other hand, if a removal of the electronic apparatus of the power receiving side is detected in the standby phase after detecting the full charge, the controller 22 moves into a standby phase after detecting the removal. In this case, the flag for confirming a recharge is cleared. Then, if a placement of the electronic apparatus of the power receiving side (an installation of the electronic apparatus on the charger) is detected in the standby phase after detecting the full charge, the controller 22 moves into a negotiation processing phase. Then, after going through the setup process and the like, for example, the normal power transmission is started.

The negotiation process section 67 of the power transmission side performs a confirmation process that confirms whether or not information can be communicated with the power transmission device 10, and a confirmation process that confirms whether or not communicated information is adequate. Specifically, the negotiation processing section 67 performs a checking process that checks standard information, coil information, and system information that shows a method for detecting a load condition. That is, the negotiation process section 67 transmits standard/coil/system information to the power transmission side, and receives that of the power receiving side from the power transmission side so as to confirm whether or not the information of the power transmission side and the power receiving side is matched.

The setup processing section 68, based on a result of the negotiation process, transmits transmission condition information of contactless power transmission to the power transmission device 10. That is, the transmission condition information such as the driving voltage and the driving frequency of the coil required for the normal power transmission is transmitted. In addition, different setup information for each apparatus and application is exchanged with the power transmission device 10.

After the setup process, the command processing section 69 performs various command processes such as the command for starting normal power transmission, the command for detecting a full charge of the battery 94, and the command for confirming a recharge of the battery 94. That is, the command processing section 69 issues and executes these commands. After the setup process, if the normal power transmission from the power transmission device 10 to the power receiving device 40 is started, the controller 52 may start power supply to the load 90 without going through the command process. For example, without the explicit issue of a command, the power supply to the load 90 may be started after the setup process.

Process Sequence of Contactless Power Transmission

Figure 3:
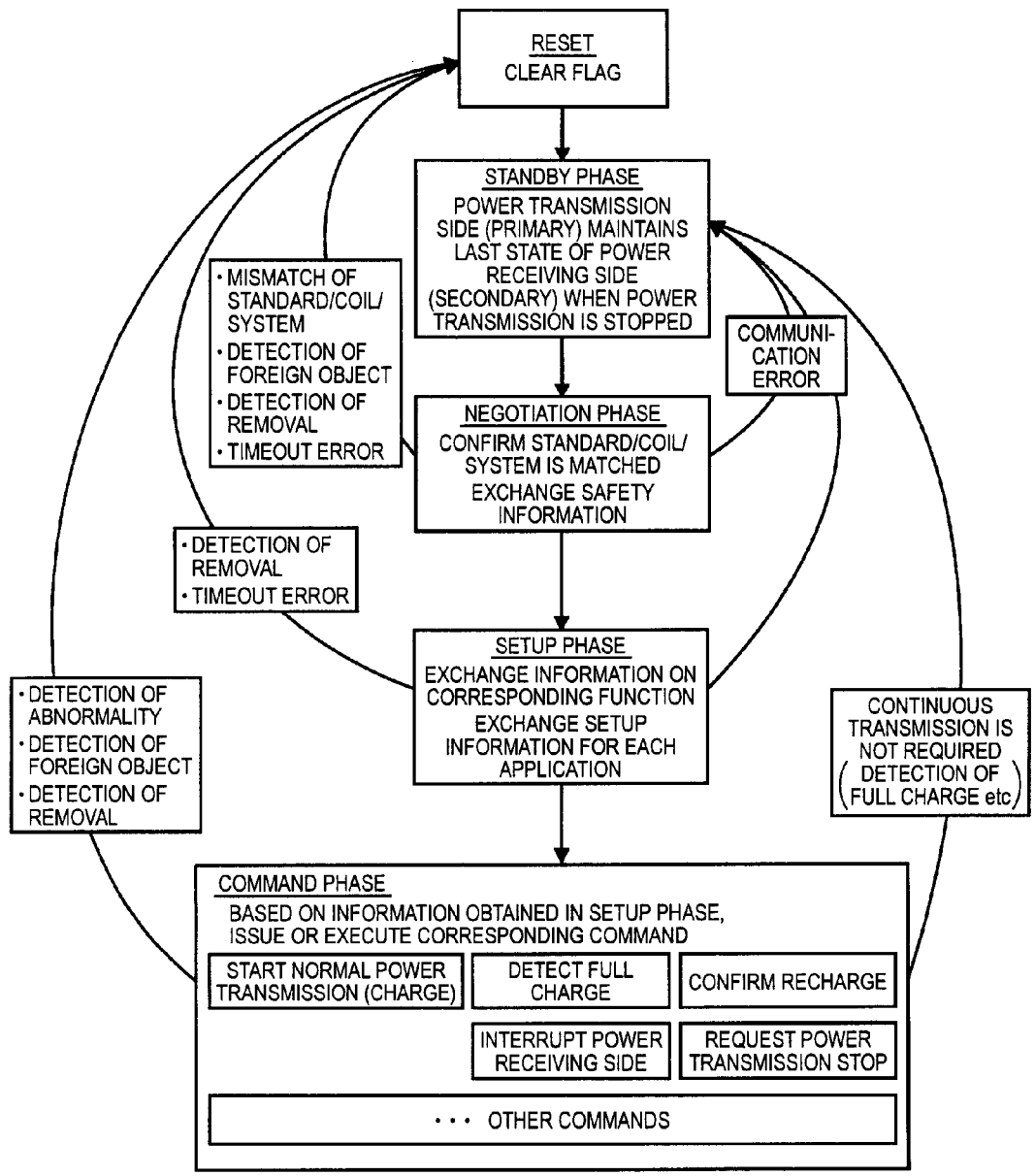
FIG. 3 is a schematic view explaining a process sequence of contactless power transmission of the embodiment.

FIG. 3 schematically shows a process sequence of contactless power transmission realized by the embodiment.

In the process sequence, the power transmission side and the power receiving side move into a standby phase after the reset state. In the reset state, various flags maintained by the power transmission side (the primary) and the power receiving side (the secondary) are cleared. Here, a flag represents a condition of the power transmission device and the power receiving device (a power transmission condition, a full charge condition, a recharge confirmation condition, and the like), and maintained by the storing sections (registers) of each device.

In the standby phase, the power transmission side (the primary) maintains the last state of the power receiving side (the secondary) when the power transmission is stopped. For example, if a full charge of the battery is detected, the power transmission side and the power receiving side move into the standby phase after detecting the full charge. In this case, since the battery is recharged after detecting a decrease in a battery voltage, the power transmission side stores a factor of stopping the power transmission is detecting the full charge. Specifically, the flag for confirming a recharge is maintained in the set state without being cleared so as to periodically confirm whether or not a recharge is required.

In the standby phase, the power transmission from the power transmission side to the power receiving side is stopped. As a result, a power supply voltage is not supplied to the power receiving side, so that the power receiving side is in a stop state. On the other hand, a power supply voltage is supplied to the power transmission side, so that the power transmission side is in an operating state. Accordingly, since an operation is stopped in the power receiving side in the standby phase, low power consumption is achieved. At this time, the flags in various states are maintained without being cleared in the power transmission side, so that the power transmission side can perform various processes with the flags after the standby phase.

The power transmission side and the power receiving side move into the negotiation phase after the standby phase. In the negotiation phase, a negotiation process is performed. In the negotiation process, a match of standard/coil/system is confirmed and safety information is exchanged. Specifically, the power transmission side and the power receiving side exchange standard/coil/system information so as to confirm whether or not the information is matched with each other. In addition, for example, safety threshold information for detecting a foreign object and the like are transmitted from the power receiving side to the power transmission side so as to exchange safety information. In the negotiation process, the follows are confirmed: whether or not information can be communicated between the power transmission side and the power receiving side; whether or not communicated information is adequate; whether or not a load condition of the power receiving side is appropriate (undetection of a foreign object); and the like.

In the negotiation process, if any of the follows happens, the power transmission side and the power receiving side move into the reset state, and the various flags are cleared: a mismatch of standard/coil/system is determined; a foreign object is detected; a removal of the apparatus is detected; and a timeout error is caused. On the other hand, if a communication error is caused, the power transmission side and the power receiving side move into the standby phase for example, and the flags are not cleared.

The power transmission side and the power receiving side move into the setup phase after the negotiation phase. In the setup phase, a setup process is performed in which setup information such as information on a corresponding function and setup information for each application is transferred. For example, based on a result of the negotiation process, a transmission condition of contactless power transmission is set. Specifically, if the power receiving side transmits the transmission condition information such as the driving voltage and the driving frequency of the coil to the power transmission side, the power transmission side sets a transmission condition such as the driving voltage and the driving frequency of the coil for the normal power transmission based on the received transmission condition information. In addition, information on a corresponding function and different setup information for each application above is also exchanged in the setup process. Specifically, the information include kinds of command that can be issued and executed by the power transmission side and the power receiving side in a command phase, and an additional corresponding function such as a periodic authentication function. Accordingly, different setup information can be exchanged in accordance with an application such as kinds (a cell phone, audio equipment, and the like) and models of the electric apparatus.

In the setup process, the power transmission side and the power receiving side move into the reset state if a removal of the apparatus is detected or a timeout error is caused. On the other hand, the power transmission side and the power receiving side move into the standby phase if a communication error and the like are caused.

After the setup phase, the power transmission side and the power receiving side move into the command phase. In the command phase, a command process is performed based on the information obtained in the setup process. That is, a corresponding command (a command that is confirmed to be available in the setup process) is issued and executed. The command executed in the command process includes, for example, the command for staring normal power transmission (a charge), the command for detecting (notifying) a full charge, the a command for confirming a recharge, a command for interrupting the power receiving side, a command for requesting a power transmission stop, and the like.

For example, when the normal power transmission is ready by the negotiation process and the setup process, the power transmission side transmits (issues) the command for staring normal power transmission (a charge) to the power receiving side. Then, the power receiving side receives the command and transmits a response command to the power transmission side so as to start the normal power transmission. If a full charge is detected in the power receiving side after the normal power transmission is started, the power receiving side transmits the command for detecting a full charge to the power transmission side.

If the continuous power transmission is not required as the detection of a full charge, the power transmission side and the power receiving side move into the standby phase after detecting the full charge. After going through the negotiation process and the setup process again, the power transmission side transmits the command for confirming a recharge to the power receiving side. Accordingly, the power receiving side checks a battery voltage so as to determine whether or not a recharge is required. If a recharge is required, the flag for confirming a recharge is reset. The power transmission side issues the command for starting the normal power transmission so as to restart the normal power transmission. On the other hand, if a recharge is not required, the flag for confirming a recharge is maintained in the set state. Then, the power transmission side and the power receiving side return to the standby phase after detecting the full charge.

If any abnormality, foreign object, or removal is detected in the command process, the power transmission side and the power receiving side move into the reset state.

Figure 4:
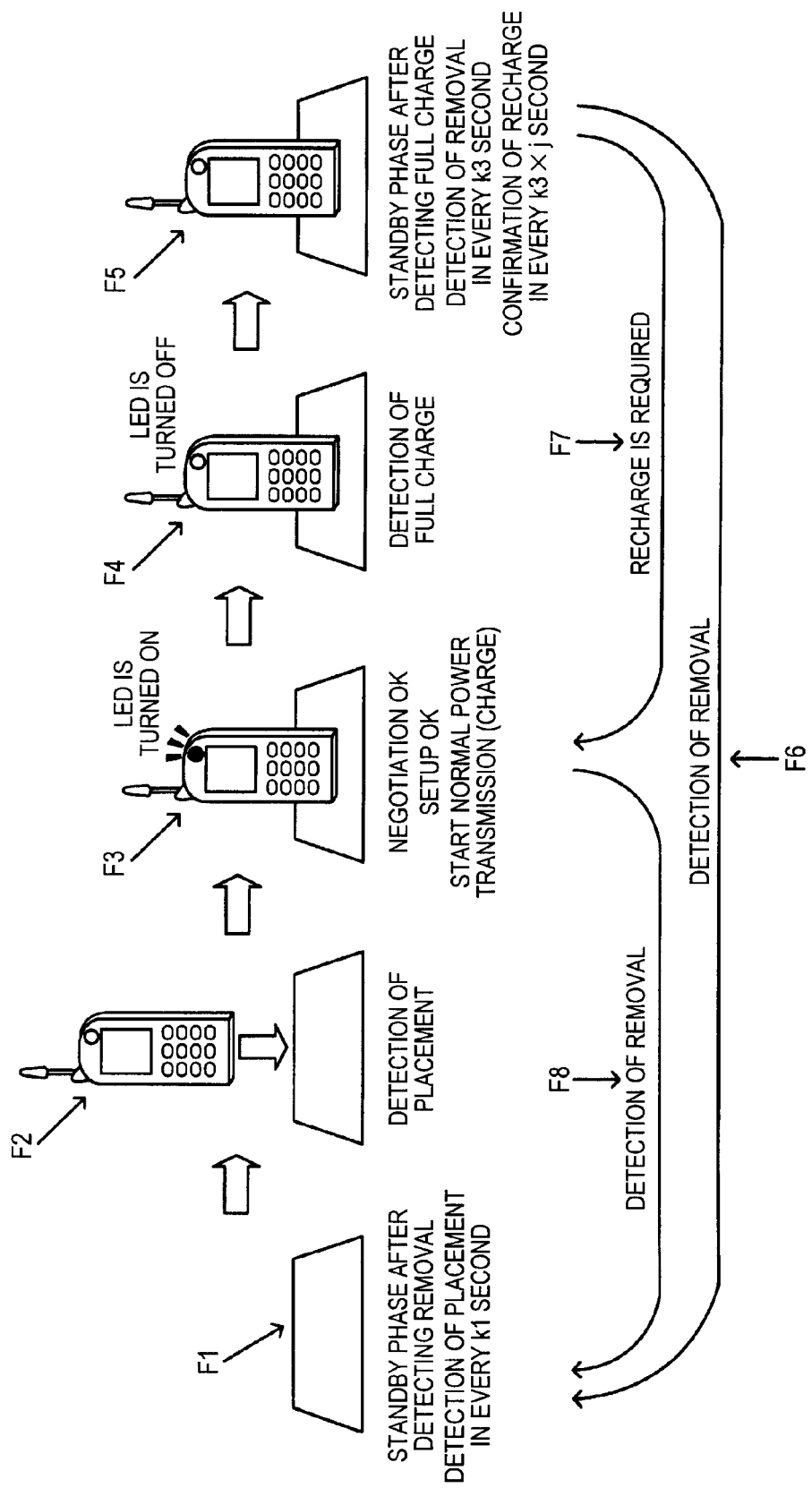
FIG. 4 is a schematic view explaining a process sequence of contactless power transmission of the embodiment.

The process sequence according to the embodiment is more specifically described with reference to FIG. 4. In the standby phase after detecting the removal shown in F1, a placement is detected every k1 seconds, for example. As shown in F2, if a placement (an installation) of the electronic apparatus is detected, the negotiation process and the setup process are performed. If the negotiation process and the setup process are normally ended as shown in F3, the command for starting normal power transmission is issued in the command process. Then, the normal power transmission is started so as to start charging the electronic apparatus. If a full charge is detected as shown in F4, an LED of the electronic apparatus is turned off. Then, the process sequence moves into the standby phase after detecting the full charge as shown in F5.

In the standby phase after detecting the full charge, a removal is detected every k3 seconds and a recharge is simultaneously confirmed every k3×j seconds. Then, in the standby phase after detecting the full charge, if a removal of the electronic apparatus is detected as shown in F6, the process sequence moves into the standby phase after detecting the removal. On the other hand, in the standby phase after detecting the full charge, if a recharge is determined to be required by confirmation as shown in F7, the negotiation process and the setup process are performed. Then, the normal power transmission is restarted so as to start recharging the battery. If a removal of the electric apparatus is detected during the normal power transmission as shown in F8, the process sequence moves into the standby phase after detecting the removal.

FIG. 5A shows a format example of a negotiation frame transferred in the negotiation process. The negotiation frame includes a beginning field, an information field, and a final field. The information field includes a matching code and a hardware information code.

FIG. 5 B shows a format example of the matching code. The matching code includes a command ID, a standard code, an extension code, and a coil code.

The command ID represents the matching code. The standard code represents a version of the standard. The extension code represents an ID code system. For example, a code length is controlled by an extension code management form and the like.

The coil code represents coil information, and includes a segment code and a coil ID (coil identification information), for example. The segment code is used for specifying an administrator of the coil ID. The coil ID is given to the primary coil (a primary coil unit) by the administrator. That is, not only to the power transmission side, but an ID of the primary coil of the power transmission side as a coil ID is also given to the power receiving side. The definition of a coil ID changes depending on the extension code. For example, if the extension code is in a first setting, the coil code is set so as to divide the segment code and the coil ID. On the other hand, if the extension code is set in a second setting, the coil code is set without dividing the segment code and the coil ID.

FIG. 5 C shows a format example of the hardware information code. The hardware information code includes a system code and a threshold of a foreign object. The system code represents system information, and specifically is information representing a method for detecting a load condition of the power transmission side and the power receiving side. Examples of the method for detecting a load condition include a pulse width detection method (a phase detection method), a current detection method, a peak voltage detection method, or a combination of the above. The system code shows a method employed by the power transmission side and the power receiving side.

The threshold of a foreign object is safety threshold information. The threshold of a foreign object, for example, is stored in the power receiving side, and is transmitted from the power receiving side to the power transmission side before the normal power transmission is started. The power transmission side, based on the threshold of a foreign object, performs a first foreign object detection that is foreign object detection before starting the normal power transmission. For example, if a load condition of the power receiving side is detected by the pulse width detection method, a threshold of a pulse width count value is transmitted from the power receiving side to the power transmission side as a threshold of a foreign object. Based on the threshold of a pulse width count value, the power transmission side performs the first foreign object detection by the pulse width detection method.

According to the process sequence according to the embodiment above, the suitability of standard/coil/system is determined and minimum safety information is exchanged in the negotiation process. Further, in the negotiation process, the possibility of communication and the adequacy of the communication information are determined as well as the propriety of a load condition of the power receiving side is determined.

In the setup process, a setup and the like of a transmission condition required for the normal power transmission are made. For example, the driving voltage and the driving frequency of the coil are set. In addition, information on an additional corresponding function and setup information required for each application above is exchanged in the setup process.

After going through the setup process and the negotiation process, the process sequence moves into the command phase for the command process. That is, a command confirmed to be available in the negotiation process is issued and executed in the command process.

Accordingly, the minimum information required for the suitability of the system and the secured safety is exchanged in the negotiation process, and the different setup information for each application is exchanged in the setup process. As a result, if the information of the power transmission side is not matched with that of the power receiving side, it is excluded in the negotiation process, whereby the setup information that is a large amount of information is not transferred. In the negotiation process, only the minimum information is transferred, thereby an amount of transferred information can be reduced. Thus, the negotiation phase is ended in a short time, allowing the process to be more efficient.

Each apparatus of the power transmission side and the power receiving side can perform minimum contactless power transmission by the negotiation process, and enhancement of function for each apparatus can be realized by exchanging the setup information. Each apparatus makes the minimum setting required for a contactless power transmission system in the negotiation process, and the system can be optimized in the setup process. As a result, a flexible system can be realized.

The power transmission side receives threshold information and system information from the power receiving side. By only setting the received threshold information and the system information, contactless power transmission and detection of a foreign object can be realized. Therefore, the process of the power transmission side can be simplified. In this case, the power receiving side transmits an appropriate combination of coil information and threshold information to the power transmission side, so that appropriate and safe contactless power transmission can be realized.

Transmitting and Receiving Coil Information

If contactless power transmission becomes widely used, various types of coil as the secondary coil of the power receiving side are expected to be marketed. That is, since a shape and a size of the electric apparatus, such as a cell phone, of the power receiving side vary, that of the secondary coil installed in the power receiving device of the electric apparatus similarly vary. In addition, since electrical energy (wattage) and an output voltage of contactless power transmission required for each electric apparatus vary, an inductance and the like of the secondary coil similarly vary.

On the other hand, even if a shape, a size, and the like of the primary coil and the secondary coil are not completely matched in contactless power transmission, power is transmitted. In this regard, in a charge using a wired cable, such case can be prevented by devising a shape and the like of the cable connector. However, in contactless power transmission, it is hard to make such effort.

In this case, as disclosed in the first example of related art, there may be a method of comparison example such that a device ID of the power receiving device is transmitted to the power transmission device so that the power transmission device authenticates ID by using the device ID.

However, in the method of comparison example, a case is not assumed that a plurality of secondary coils being corresponded to a single primary coil. Accordingly, if various types of secondary coil are marketed, it is hard to deal with it. That is, if the plurality of the secondary coils is corresponded to the single primary coil, the power transmission side has to store a plurality of device IDs. Therefore, management becomes complex.

In the embodiment, a method is employed such that the storing section 23 of the power transmission side stores coil information of the power transmission side and the storing section 53 of the power receiving side stores coil information of the power receiving side so as to transmit and receive these coil information. If such the method is employed, since management is not that complicated, a plurality of the secondary coils can be corresponded to a single coil even if various types of secondary coil are marketed.

Figure 6:
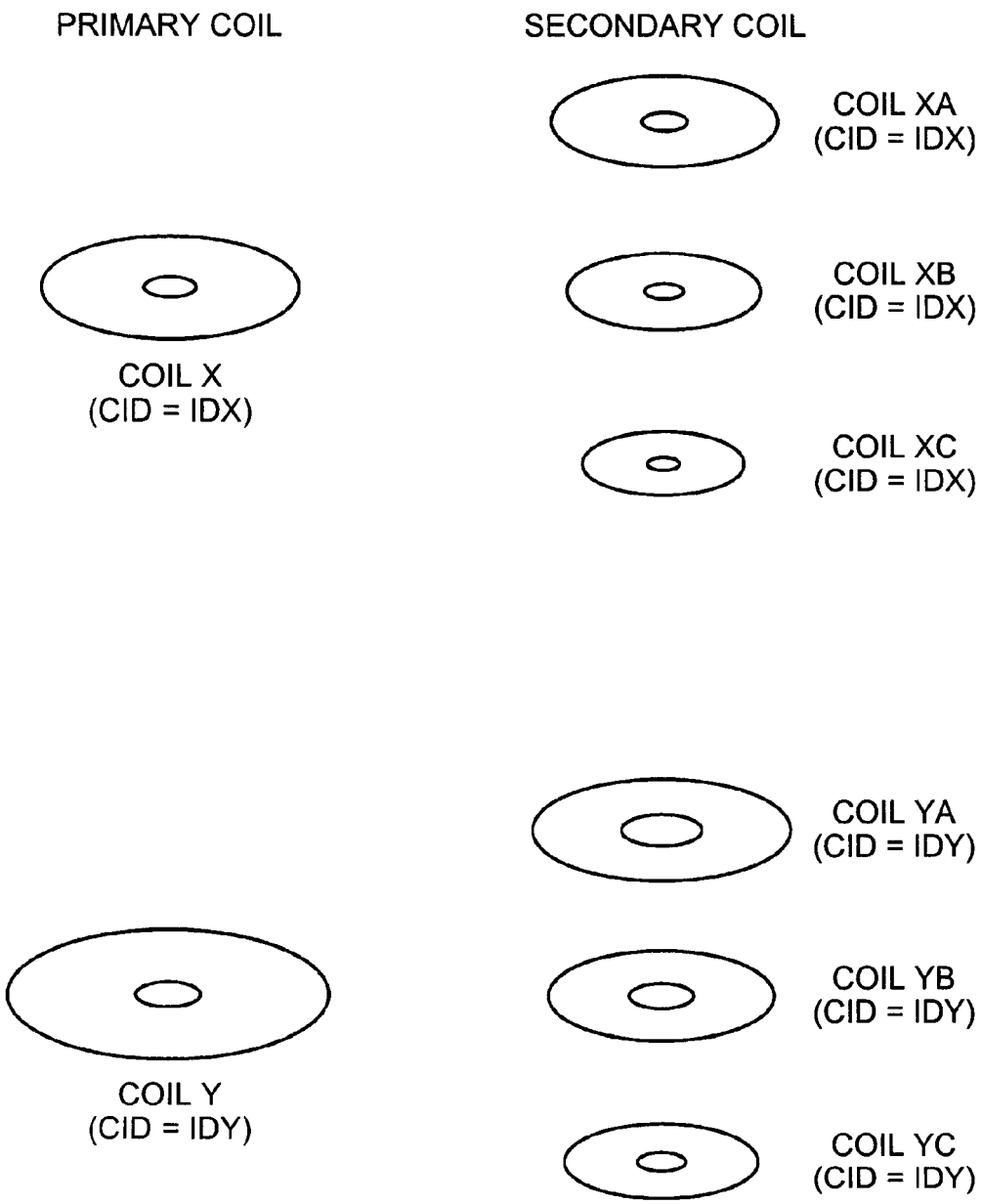
FIG. 6 is a schematic view explaining a method for matching a plurality of secondary coils to a single primary coil.

Specifically, as shown in FIG. 6, as an appropriate combination of coil for a primary coil X (a primary coil of a first type in a broad sense), secondary coils XA, XB, and XC (secondary coils of a first to an n types in a broad sense) are corresponded. That is, a combination of the primary coil X and the secondary coils XA, XB, or XC is an appropriate combination. With this combination, it is assured that appropriate contactless power transmission is realized. Similarly, secondary coils YA, YB, and YC are corresponded to a primary coil Y.

In FIG. 6, not an ID of the secondary coil itself, but an ID of the primary coil corresponding to the secondary coil is given to the secondary coil. For example, if a coil ID of the primary coil X is CID=IDX, then EDX, the ID of the primary coil X, is given to the secondary coils XA, XB, and XC that belong to the primary coil X. Similarly, if a coil ID of the primary coil Y is CID=IDY, IDY, the ID of the primary coil Y, is given to the secondary coils YA, YB, and YC that belong to the primary coil Y.

That is, the power transmission device 10 including the primary coil X storing IDX, the coil ID of the primary coil X, as coil information of the power transmission side. The power receiving device 40 including the secondary coil XA also storing IDX, the corresponding coil ID of the primary coil X, as coil information of the power receiving side.

Then, for example, if the power receiving device 40 transmits IDX, the coil ID of the primary coil X, as coil information of the power receiving side before starting the normal power transmission. The power transmission device 10 determines whether or not IDX of the coil information of the power transmission side and IDX of the coil information of the power receiving side received from the power receiving device 40 are matched. If they are matched, the normal power transmission is started.

For example, the power receiving device 40 including the secondary coil YA transmits IDY, coil information of the power receiving side, to the power transmission device 10 including the primary coil X. In this case, since IDX, the coil information of the power transmission side, and IDY, the coil information of the power receiving side do not match, the normal power transmission and the like are not performed. That is, the power receiving device 40 transmits IDX (identification information of the primary coil of the first type), a coil ID of the primary coil, as coil information of the power receiving side when the secondary coil is any of one of the coils XA, XB, and XC (the first to the n types of coils).

In this way, in FIG. 6, an ID of the primary coil to which the secondary coil itself belongs is given to each secondary coil. Accordingly, the secondary coil only needs to store the ID of its primary coil, and does not need to store an ID of the secondary coil. Therefore, management and the like can be simplified. For example, in a mismatched combination such as the primary coil X and the secondary coil YA, since the coil IDs are not matched, the normal power transmission is not performed. Accordingly, even if there appear various types of secondary coils, appropriate contactless power transmission can be realized.

The power transmission side may store a plurality of coil information of the power transmission side. For example, in FIG. 6, if the power transmission side can be corresponded to both the coil X and the coil Y, IDX, coil information of the primary coil X, and IDY, coil information of the secondary coil Y, are stored as coil information of the power transmission side. Then, if IDX, coil information of the coil XA, is transmitted from the power receiving device 40, the power transmission device 10 transmits IDX to the power receiving device 40. IDX is the matched coil information to the coil information of the power receiving side out of the plurality of the coil information of the power transmission side, IDX and IDY. On the other hand, if IDY, coil information of the coil YA, is transmitted from the power receiving device 40, the power transmission device 10 transmits IDY to the power receiving device 40. IDY is the matched coil information to the coil information of the power receiving side out of IDX and IDY. Accordingly, variations of matched coils between the primary side and the secondary side can be increased, whereby more flexible system can be achieved.

Operation

Next, an operation of the embodiment will be described in detail with reference to FIGS. 7A to 11C.

Figure 7A:
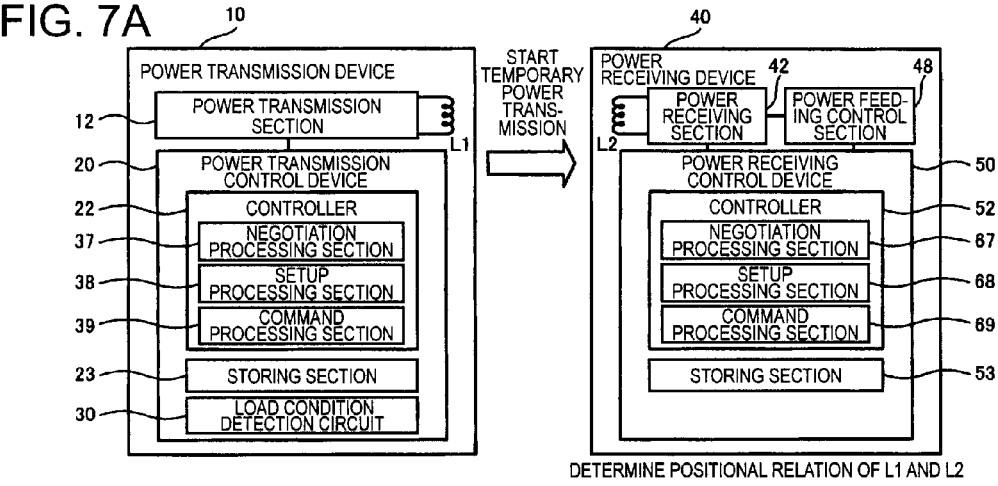
FIGS. 7A, 7B, and 7C are schematic views explaining an operation of the embodiment.

As shown in FIG. 7A, first, the power transmission device 10 starts temporary power transmission (power transmission for detecting a position) before starting the normal power transmission. With this temporary power transmission, a power supply voltage is supplied to the power receiving device 40, so that the power receiving device 40 is turned on. The power receiving device 40, for example, determines whether or not a positional relation between the primary coil L1 and the secondary coil L2 is appropriate. Specifically, the power receiving device 40 determines whether or not the positional relation between the primary coil L1 and the secondary coil L2 is a relation shown in FIG. 1B, for example.

Figure 7B:
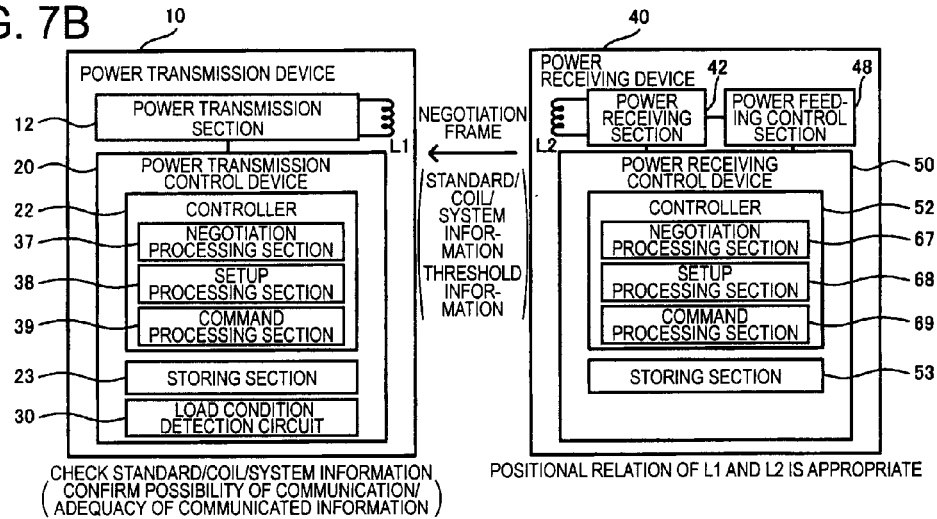

As shown in FIG. 7B, if the position relation between the L1 and the L2 is determined to be appropriate, the power receiving device 40 (the negotiation processing section 67) makes a negotiation frame so as to transmit to the power transmission device 10. The negotiation frame includes, for example, standard/coil/system information and threshold information.

If the power transmission device 10 (the negotiation processing section 37) receives the negotiation frame from the power receiving device 40, the standard/coil/system information of the power receiving side included in the received negotiation frame is checked with that of the power transmission side stored in the storing section 23. That is, a confirmation process is performed that confirms whether or not information can be communicated and whether or not communicated information is adequate. Further, the threshold information received from the power receiving device 40 is set as threshold information for detecting a load condition of the power receiving side.

Figure 7C:
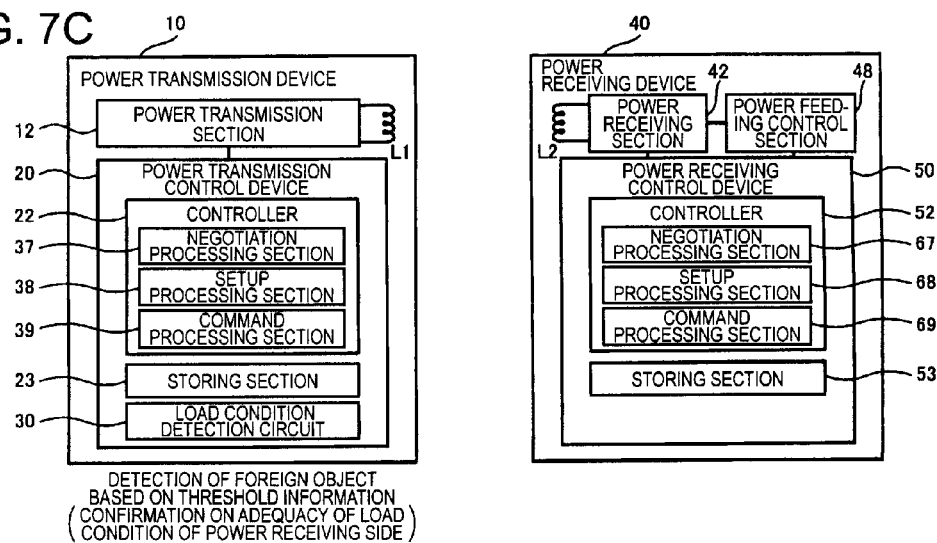

Next, as shown in FIG. 7C, the power transmission device 10, based on the threshold information received from the power receiving device 40, detects insertion of a foreign object between the primary coil L1 and the secondary coil L2. That is, the power transmission device 10 confirms whether or not a load condition of the power receiving side is appropriate. Then, as shown in FIG. 8A, if it is determined that the standard/coil/system information is matched and no foreign object is detected, the power transmission device 10 makes a negotiation frame including the standard/coil/system information of the power transmission side so as to transmit to the power receiving device 40.

Then, the power receiving device 40 checks the standard/coil/system information of the power receiving side with that included in the received negotiation frame. Then, as shown in FIG. 8B, the power receiving device 40 (the setup processing section 68) makes a setup frame so as to transmit to the power transmission device 10. The setup frame, for example, includes the transmission condition information such as the driving voltage and the driving frequency of the coil and corresponding function information that shows a function (a command and the like) corresponding to the power receiving side.

If the power transmission device 10 (the setup processing section 38) receives the setup frame, based on the transmission condition information received from the power receiving side, sets a transmission condition of the normal power transmission. Further, based on the received corresponding function information of the power receiving side, it is determined that whether or not the corresponding function is matched between the power transmission side and the power receiving side. Then, as shown in FIG. 8C, the power transmission device 10 makes a setup frame including corresponding function information of the power transmission side so as to transmit to the power receiving device 40. Then, based on the received corresponding function information of the power transmission side, the power receiving side determines whether or not the corresponding function is matched between the power transmission side and the power receiving side.

Figure 9A:
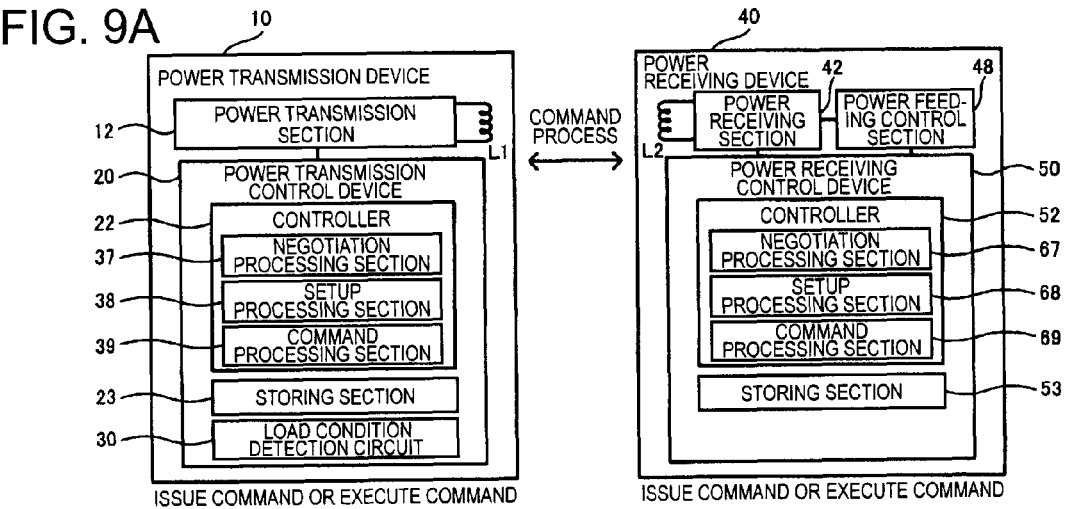
FIGS. 9A, 9B, and 9C are schematic views explaining the operation of the embodiment.

Next, as shown in FIG. 9A, based on a result of the setup process, the command process is performed. That is, the power transmission device 10 (the command processing section 39) and the power receiving device 40 (the command processing section 69) issue or execute a corresponding command.

Figure 9B:
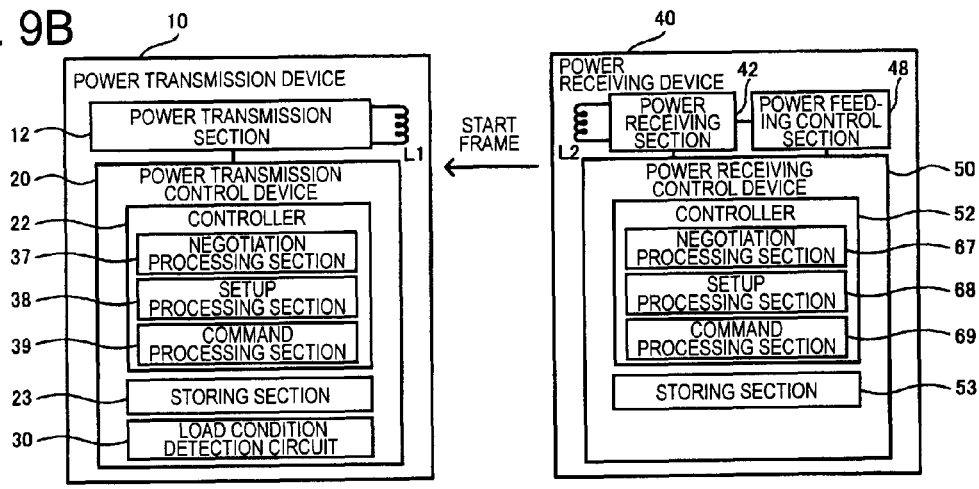
Figure 9C:
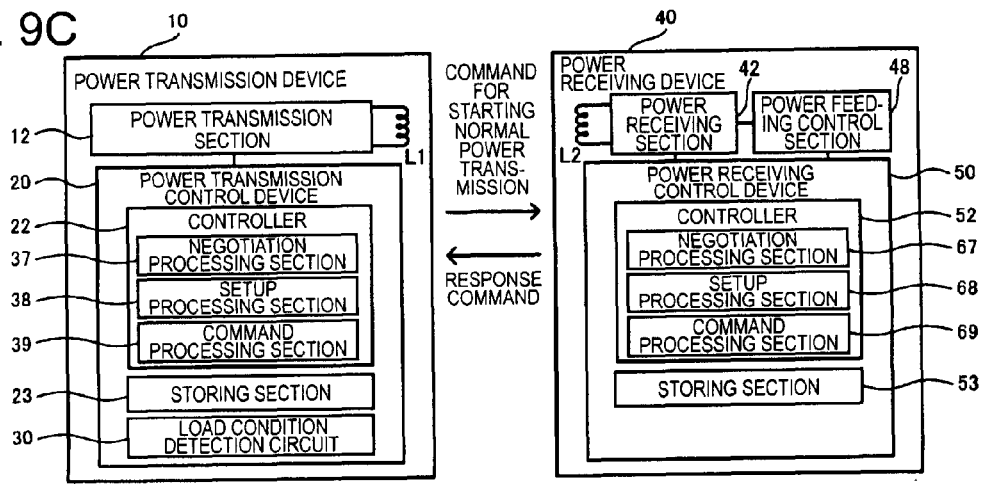

If the normal power transmission (a charge) is performed, as shown in FIG. 9B, the power receiving device 40 transmits a start frame to the power transmission device 10. Then, as shown in FIG. 9C, the power transmission device 10 issues the command for starting normal power transmission (a command for starting a charge) so as to transmit to the power receiving device 40. The power receiving device 40 transmits a response command for the command for starting normal power transmission so as to transmit to the power transmission device 10. Accordingly, the power transmission device 10 and the power receiving device 40 perform the command process for the normal power transmission.

Specifically, first, as shown in FIG. 10A, the power transmission device 10 starts the normal power transmission to the power receiving device 40. In this case, as the driving voltage and the driving frequency of the coil, the one set in the setup frame shown in FIGS. 8B and 8C is used.

As shown in FIG. 10B, if a full charge of the battery 94 is detected after the normal power transmission is started, the power receiving device 40 issues the command for detecting a full charge to notify the detection of a full charge to the power transmission device 10. Specifically, the power receiving device 40 makes a save frame including the command for detecting a full charge so as to transmit to the power transmission device 10. Accordingly, the power transmission device 10 stops the power transmission to the power receiving device 40, and moves into the standby phase after detecting the full charge. In the standby phase, it is confirmed for each predetermined period that whether or not a recharge of the battery 94 is required.

As shown in FIG. 10C, the power transmission device 10 sets the flag for confirming a recharge to one to confirm whether or not a recharge is required. That is, in the standby phase after detecting the full charge, the flag for confirming a recharge is maintained in the set state without being cleared. Then the power transmission device 10 starts temporary power transmission to the power receiving device 40 so as to perform the negotiation process, the setup process, and the command process.

As shown in FIG. 11A, due to a command branch in the command process, the power transmission device 10 issues the command for confirming a recharge so as to transmit to the power receiving device 40. Accordingly, the power receiving device 40 confirms a battery voltage (a charging voltage) of the battery 94. If a recharge is determined to be required, the power receiving device 40 transmits the command for starting a charge. Then, the power transmission device 10 resets the flag for confirming a recharge to zero, and starts the normal power transmission after the negotiation process, the setup process, and the command process.

In addition, as shown in FIG. 11B, if a removal of the electronic apparatus of the power receiving side is detected in the standby phase after detecting the full charge, the power transmission to the power receiving device 40 is stopped. Then, the power transmission device 10 moves into the standby phase after detecting the removal. In this case, the flag for confirming a recharge is reset to zero, and the power transmission device 10 moves into the reset state.

As shown in FIG. 11C, if a placement of the electronic apparatus of the power receiving side is detected in the standby phase after detecting the removal, the power transmission device 10 moves into the negotiation processing phase. After going through the setup process and the command process, for example, the normal power transmission is started. Accordingly, a charge of the battery 94 of the placed electronic apparatus is started.

As shown in FIGS. 7A to 11C, in the embodiment, a sequence process is performed in which the negotiation process, the setup process, and the command process are subsequently performed. Accordingly, the minimum information required for the suitability of the system and the secured safety is exchanged in the negotiation process, and the different setup information for each application and apparatus is exchanged in the setup process. Thus, a contactless power transmission system with high versatility and capable of improving efficiency can be provided. Since the minimum setting is made in the negotiation process and the system can be optimized in the setup process, a flexible system can be realized.

Specific Structural Example

Figure 12:
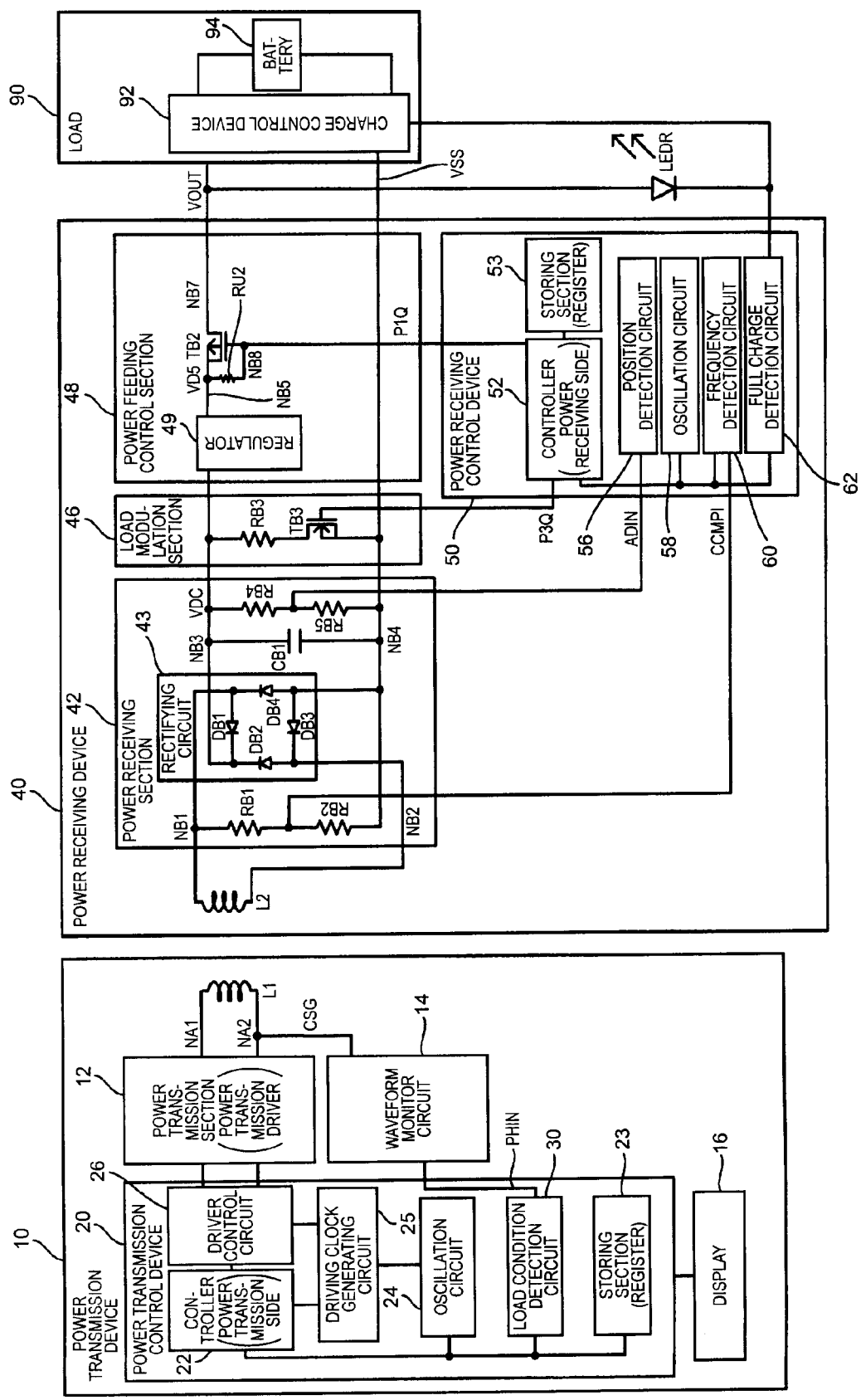
FIG. 12 is a specific structural example of the power transmission device, the power transmission control device, the power receiving device, and the power receiving control device according to the embodiment.

A specific structural example of the embodiment is shown in FIG. 12. Hereinafter, the elements described in FIG. 2 are indicated by the same numerals and the description thereof is omitted.

A waveform monitor circuit 14 (a rectifying circuit), based on a coil terminal signal CGS, generates an induced voltage signal PHIN for a waveform monitor. For example, the coil terminal signal CGS that is an induced voltage signal for the primary coil L1 may exceed a maximum rating voltage of an IC of the power transmission control device 20 or become a negative voltage. The waveform monitor circuit 14 receives the coil terminal signal CGS so as to generate the induced voltage signal PHIN for a waveform monitor and output to a terminal for a waveform monitor of the power transmission control device 20. The induced voltage signal PHIN is capable of being detecting as a waveform by the load condition detection circuit 30 of the power transmission control device 20. A display 16 displays various conditions of the contactless power transmission system (conditions of power transmitting, ID authenticating, and the like) with colors, images, and the like.

An oscillation circuit 24 generates a clock for the primary side. A driving clock generating circuit 25 generates a driving clock defining a driving frequency. A driver control circuit 26, based on the driving clock from the driving clock generating circuit 25 and a frequency set signal from the controller 22, generates a control signal having a desired frequency. Then, the control signal is outputted to first and second power transmission drivers of the power transmission section 12 so as to control the first and the second power transmission drivers.

The load condition detection circuit 30 shapes a waveform of the induced voltage signal PHIN so as to generate a waveform shaping signal. For example, if the signal PHIN is beyond a predetermined threshold voltage, the load condition detection circuit 30 generates a waveform shaping signal (a pulse signal) of a square wave (a rectangular wave) that becomes active (e.g., an H level). The load condition detection circuit 30, based on the waveform shaping signal and the driving clock, detects pulse width information (a pulse width period) of the waveform shaping signal. Specifically, the load condition detection circuit 30 receives the waveform shaping signal and the driving clock from the driving clock generating circuit 25 so as to detect plus width information of the waveform shaping signal. Accordingly, the pulse width information of the induced voltage signal PHIN is detected.

As for the load condition detection circuit 30, the detection method is not limited to the pulse width detection method (a phase detection method), and various methods, such as a current detection method and a peak voltage detection method, can be employed.

The controller 22 (the power transmission control device), based on a detection result in the load condition detection circuit 30, determines a load condition (a load variation, a degree of the load) of the power receiving side (the secondary side). For example, the controller 22, based on the pulse width information detected in the load condition detection circuit 30 (a pulse width detection circuit), determines a load condition of the power receiving side. Then, the controller 22 detects, for example, data (a load), a foreign object (metal), a removal (set and removal), and the like. That is, a pulse width period that is the pulse width information of the induced voltage signal changes in accordance with a load condition of the power receiving side. The controller 22 can detect a load fluctuation of the power receiving side based on the pulse width period (a count value obtained by measuring the pulse width period).

The power receiving section 42 converts an alternating induced voltage signal of the secondary coil L2 into a direct current voltage. The conversion is performed by a rectifying circuit 43 included in the power receiving section 42.

A load modulation section 46 performs a load modulation process. Specifically, when desired data is transmitted from the power receiving device 40 to the power transmission device 10, a load of the load modulation section 46 (the secondary side) is variably changed so as to change a signal waveform of the induced voltage of the primary coil L1. Accordingly, the load modulation section 46 includes a resistance RB3 provided in series between nodes NB3 and NB4, and a transistor TB3 (an N-type CMOS transistor). The transistor TB3 is on/off controlled by a signal P3Q from the controller 52 of the power receiving control device 50. When the transistor TB3 is on/off controlled so as to perform a load modulation, a transistor TB2 of the power feeding control section 48 is turned off. Accordingly, the load 90 is in a state of not being electrically coupled to the power receiving device 40.

The power feeding control section 48 controls power feeding to the load 90. A regulator 49 adjusts a voltage level of a direct current voltage VDC obtained by the conversion in the rectifying circuit 43 so as to generate a power supply voltage VD5 (e.g., 5V). The power receiving control device 50 operates with a supply of the power supply voltage VD5, for example.

The transistor TB2 (a P-type CMOS transistor, a power feeding transistor) is controlled by a signal P1Q from the controller 52 of the power receiving control device 50. Specifically, the transistor TB2 is turned off during the negotiation process and the setup process while turned on after the normal power transmission is started.

A position detection circuit 56 determines whether or not a positional relation between the primary coil L1 and the secondary coil L2 is appropriate. An oscillation circuit 58 generates a clock for the primary side. A frequency detection circuit 60 detects a frequency (f1 and f2) of a signal CCMP1. A full charge detection circuit 62 detects whether or not the battery 94 (a secondary battery) of the load 90 is in a full charge state (a charge state).

The load 90 may include a charge control device 92 performing a charge control and the like of the battery 94. The charge control device 92 (a charge control IC) can be realized by an integrated circuit device and the like. Further, as a smart battery, the battery 94 itself may have a function of the charge control device 92.

In FIG. 12, data communication from the power transmission side to the power receiving side can be realized by a frequency modulation while data communication from the power receiving side to the power transmission side can be realized by a load modulation.

Figure 13A:
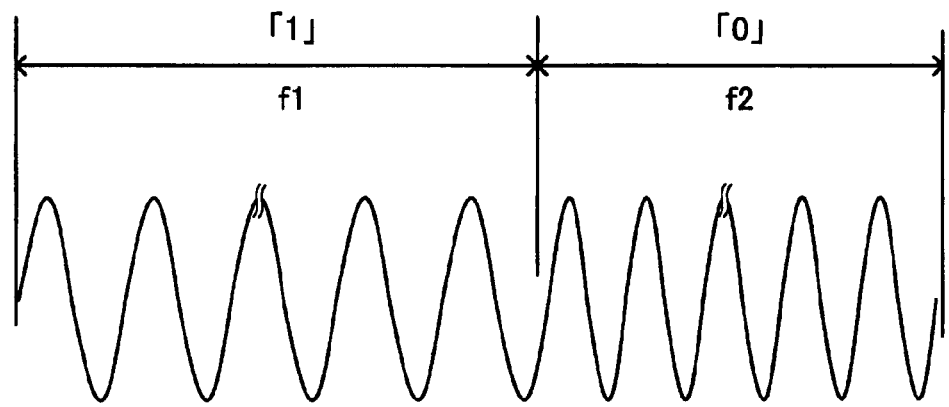
FIGS. 13A and 13B are characteristic graphs explaining a method for data transmission by a frequency modulation and a load modulation.

Specifically, as shown in FIG. 13A, for example, when data "1" is transmitted to the power receiving side, the power transmission section 12 generates an alternate current voltage of the frequency f1. On the other hand, when data "0" is transmitted, the power transmission section 12 generates an alternate current voltage of the frequency f2. Then, the frequency detection circuit 60 of the power receiving side detects a change in the frequency so as to determine data "1" or "0." Accordingly, data communication by a frequency modulation from the power transmission side to the power receiving side can be realized.

Figure 13B:
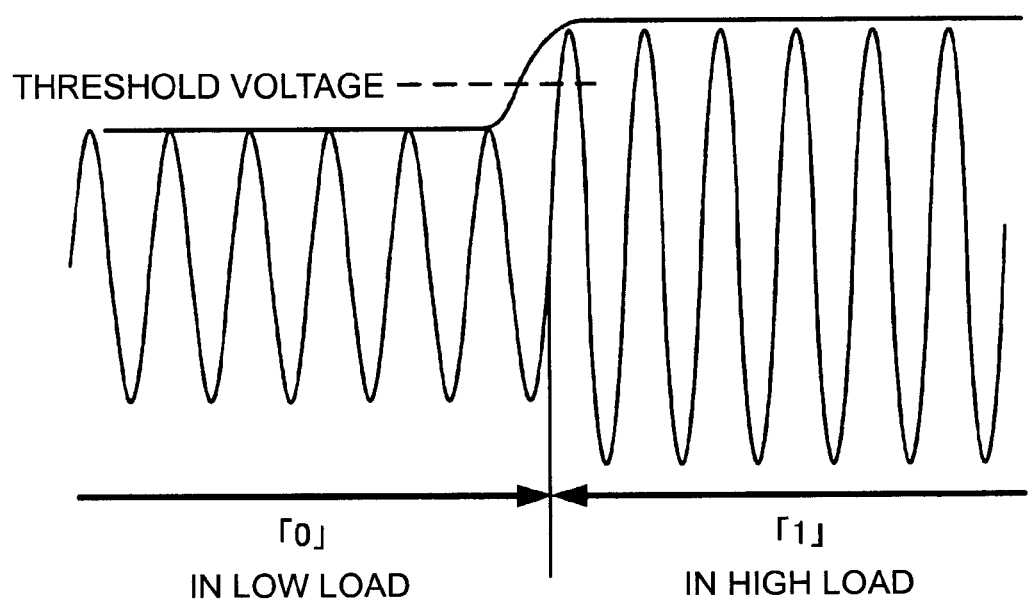

On the other hand, in the load modulation section 46 of the power receiving side, a load of the power receiving side is variably changed in accordance with transmitted data. Accordingly, as shown in FIG. 13B, a signal waveform of the induced voltage of the primary coil L1 is changed. For example, when data "1" is transmitted to the power transmission side, the power receiving side is in a high load condition. On the other hand, when data "0" is transmitted, the power receiving side is in a low load condition. Then, the load condition detection circuit 30 of the power transmission side detects a change in the load condition of the power receiving side so as to determine data "1" or "0." Accordingly, data communication by a load modulation from the power receiving side to the power transmission side can be realized.

In FIGS. 13A and 13B, data communication from the power transmission side to the power receiving side can be realized by a frequency modulation while data communication from the power receiving side to the power transmission side can be realized by a load modulation. However, another modulation method or other method may be employed.

Operation

Figure 14:
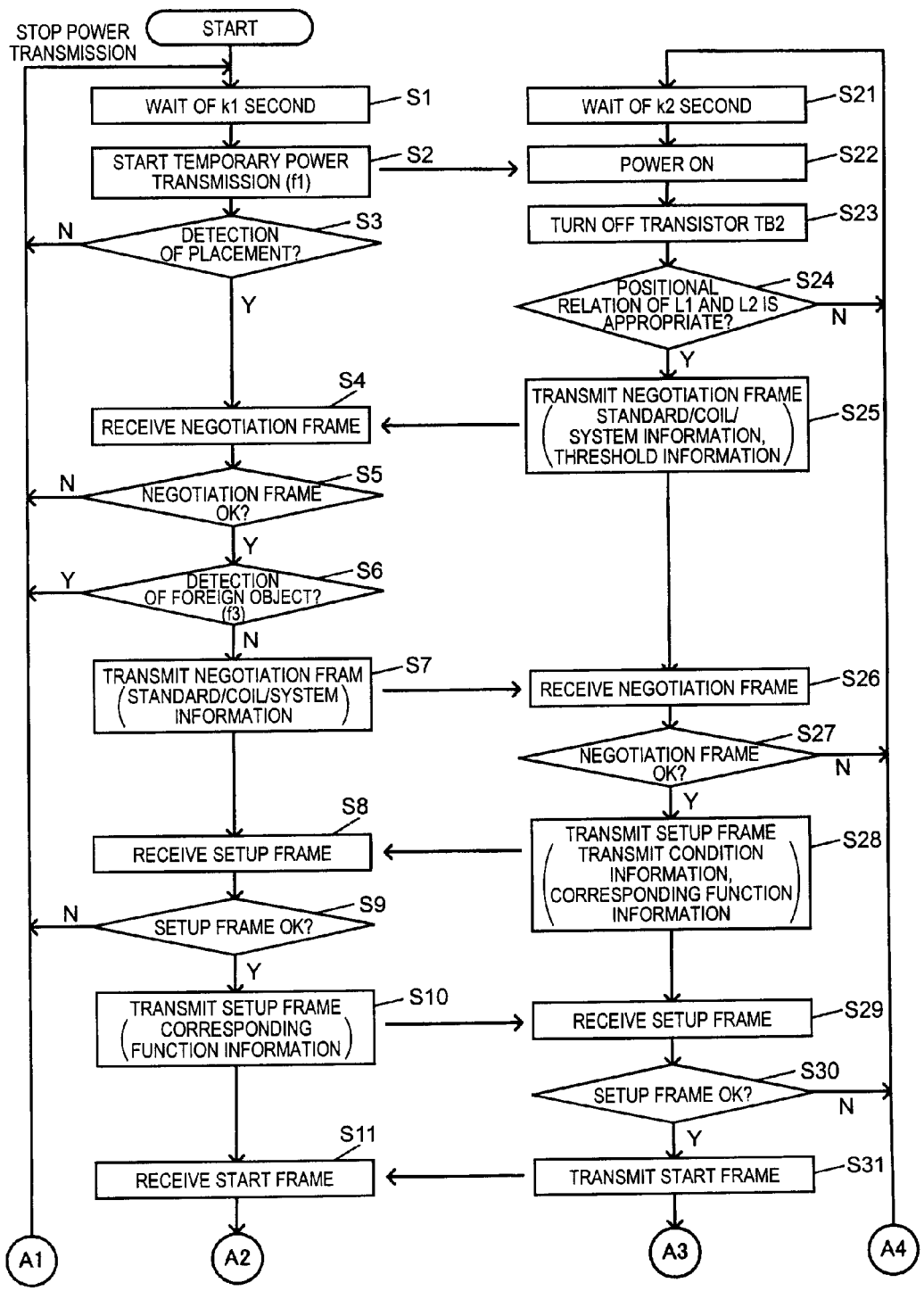
FIG. 14 is a flowchart explaining the operation of the embodiment.
Figure 15:
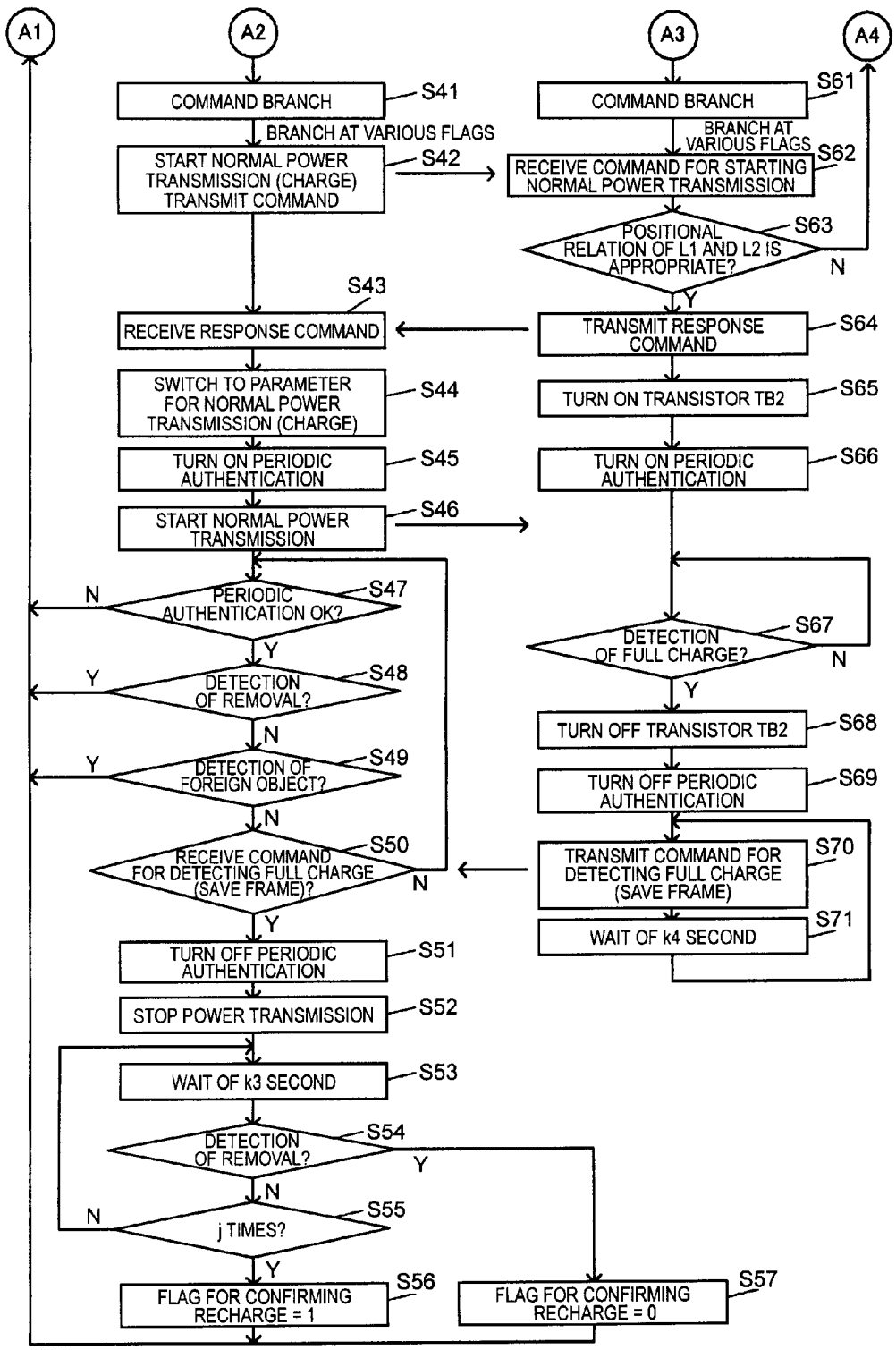
FIG. 15 is a flowchart explaining the operation of the embodiment.

Next, an operation of the power transmission side and the power receiving side will be described in detail with reference to flowcharts shown in FIGS. 14 and 15.

By turning on a power, the power transmission side, for example, after a wait of k1 seconds (step S1), temporary power transmission of before starting the normal power transmission is performed (step S2). The temporary power transmission is temporary electric power transmission for placement detection, position detection, and the like. That is, the power transmission is for detecting whether or not the electric apparatus is placed on the charger as shown in the F2 of FIG. 4. If the electric apparatus is placed, it is for detecting whether or not the electric apparatus is placed on an appropriate position. A driving frequency (a frequency of a driving clock from the driving clock generating circuit) of the temporary power transmission is set to the f1, for example.

The temporary power transmission from the power transmission side allows the power receiving side to be turned on (step S22) and a reset of the power receiving control device 50 to be released. Then, the power receiving control device 50 sets the signal P1Q shown in FIG. 12 to the H level. Accordingly, the transistor TB2 of the power feeding control section 48 is turned off (step S23), so that the electrical connection between the power receiving side and the load 90 is interrupted.

Next, the power receiving side determines whether or not a positional relation (a position level) between the primary coil L1 and the secondary coil L2 is appropriate (step S24). If the positional relation is not appropriate, the power receiving side waits, for example, for a period of k2 seconds.

On the other hand, if the positional relation is appropriate, the power receiving side makes a negotiation frame so as to transmit to the power transmission side (step S25). Specifically, by the load modulation described in FIG. 13B, the negotiation frame is transmitted. The negotiation frame includes, for example, standard information stored in the storing section 53 of the receiving side, a matching code such as coil information, and hardware information such as system information (a method for detecting a load condition) and threshold information (threshold of detecting a load condition).

When the power transmission side receives the negotiation frame (step S4), the power transmission side verifies the negotiation frame (step S5). Specifically, the power transmission side confirms whether or not the standard/coil/system information stored in the storing section 23 of the power transmission side and that received from the power receiving side are matched. Then, if the negotiation frame is determined to be appropriate, foreign object detection is performed (step S6).

Specifically, the power transmission side sets a driving frequency to a frequency for detecting a foreign object f3. Then, based on the threshold information (safety threshold information) received from the power receiving side, a first foreign object detection before starting the normal power transmission is performed so as to determine whether or not a load condition of the power receiving side is appropriate. For example, an enable signal for detecting a foreign object is activated so as to instruct the load condition detection circuit 30 to start detecting a foreign object. The detection of foreign object can be realized by comparing, for example, load condition detection information (pulse width information) from the load condition detection circuit 30 with a threshold of detecting a load condition (META) received from the power receiving side. After the period of detecting a foreign object ends, the power transmission side returns the frequency to the frequency for normal power transmission f1.

If the negotiation frame is determined to be non-appropriate in the step S5 or a foreign object is detected in the step S6, the power transmission side stops the power transmission so as to return to the step S1.

Next, the power transmission side makes a negotiation frame so as to transmit to the power receiving side (step S7). The negotiation frame includes, for example, standard information, coil information, and system information stored in the storing section 23 of the power transmission side.

When the power receiving side receives the negotiation frame (step S26), the power receiving side verifies the negotiation frame (step S27). Specifically, the power receiving side confirms whether or not the standard/coil/system information stored in the storing section 53 of the power receiving side and that received from the power transmission side are matched. Then, if the negotiation frame is determined to be appropriate, the power receiving side generates a setup frame so as to transmit to the power transmission side (step S28). The setup frame includes parameter data such as transmission condition information and corresponding function information. Here, the transmission condition information includes such as the driving voltage and the driving frequency of the primary coil. The corresponding function information represents an additional function for each application and the like. If the setup frame is not appropriate, the power receiving side returns to the step S21.

When the power transmission side receives the setup frame (step S8), the power transmission side verifies the setup frame (step S9). If the setup frame from the power receiving side is appropriate, the power transmission side makes a negotiation frame of the power transmission side so as to transmit to the power receiving side (step S10). On the other hand, if the setup frame is not appropriate, the power transmission side stops the power transmission so as to return to the step S1.

When the power receiving side receives the setup frame (step S29), the power receiving side verifies the setup frame (step S30). If the setup frame is appropriate, the power receiving side makes a start frame so as to transmit to the power transmission side (step S31). On the other hand, if the setup frame is not appropriate, the power receiving side returns to the step S21.

If the setup frame is transmitted, the power transmission side and the power receiving side move into a command branch (steps S41 and S61). That is, a command determination is performed so as to split into a command process corresponding to each flag.

Specifically, if a command requires a priority process (e.g., an interrupting command and the like) does not exist, the power transmission side transmits the command for starting normal power transmission (a charge) to the power receiving side (step S42). When the power receiving side receives the command for staring normal power transmission (step S62), it is determined whether or not the positional relation between the primary coil L1 and the secondary coil L2 is appropriate (step S63). If it is appropriate, the response command is transmitted to the power transmission side (step S64).

When the power transmission side receives the response command (step S43), various parameters are switched to a parameter for normal power transmission (step S44). Specifically, a parameter for a transmission condition and the like are switched to a parameter set in the setup process. Then, periodic authentication is turned on (step S45), and the normal power transmission is started (step S46).

When the power receiving side transmits the response command (step S64), the transistor TB2 of the power feeding control section 48 is turned on so as to start power supply to the load 90. The periodic authentication is turned on so as to perform a periodic load modulation (step S66). Specifically, the transistor TB3 of the load modulation section 46 is turned on/off in a predetermined pattern in a periodic authentication period.

After the normal power transmission is started, in the periodic authentication period performed by the periodic load modulation, the power transmission side detects a takeover state caused by a metal foreign object and the like having a large area (step S47). Further, removal detection and foreign object detection are performed (steps S48 and S40). If any takeover in the periodic authentication, a removal, or a foreign object is detected, the power transmission is stopped so as to return to the step S1.

After the normal power transmission is started, the power receiving side detects whether or not the battery 94 is a full charge (step S67). If a full charge is detected, the transistor TB2 is turned off (step S68), and the power supply to the load 90 is stopped. Further, the periodic authentication is turned off (step S69). Then, the command for detecting a full charge (a save frame) that notifies detection of a full charge is transmitted to the power transmission side (step S70), and after a wait period of k4 seconds (step S71), the process of the step 70 is repeated.

When the power transmission side receives the command for detecting a full charge (a save frame), the periodic authentication is turned off, and the power transmission is stopped (steps S51 and S52). Then, the power transmission side moves into the standby phase after detecting the full charge (step S53).

In the standby phase after detecting the full charge, for example, a removal is detected every k3 seconds (step S54). Then, if a removal is detected, the flag for confirming a recharge is reset to zero (step S57), and the power transmission is stopped so as to return to the step S1.

In the standby phase after detecting the full charge, for example, a recharge is confirmed every k3×j seconds, and the flag for confirming a recharge is set to one (step S55 and S56). Then, the power transmission is stopped so as to return to the step S1. In this case, the negotiation process and the setup process are performed. Since the flag for confirming a recharge is one at the command branch of the step S41, the power transmission side moves into the command process of confirming a recharge.

Coil Parameter

Figure 16A:
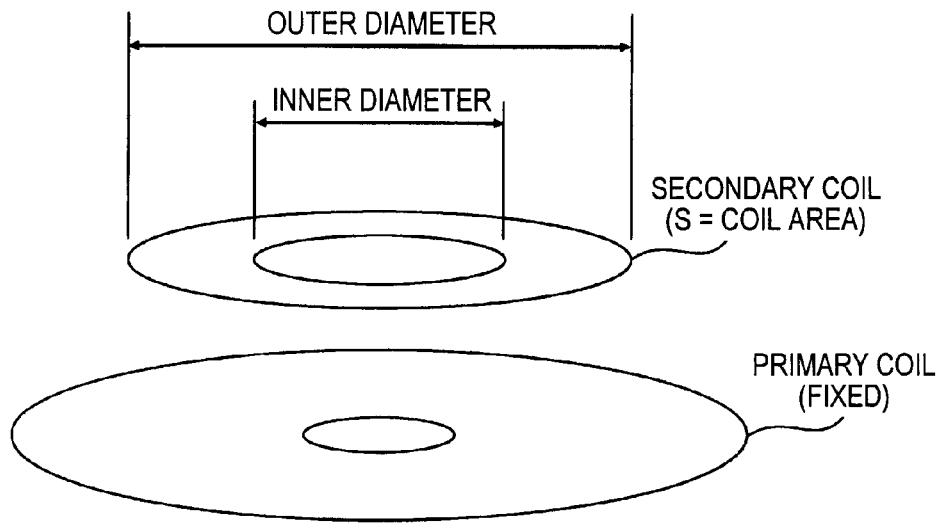
FIGS. 16A and 16B are schematic views explaining a coil parameter.

In FIG. 16A, a coil parameter includes an inner diameter, an outer diameter, a coil area, and the like. The coil parameter represents characteristics of a coil. Here, a single coil having a fixed coil parameter is prepared as the primary coil and various coils having different coil parameters are prepared as the secondary coil so as to perform a measurement.

Figure 16B:
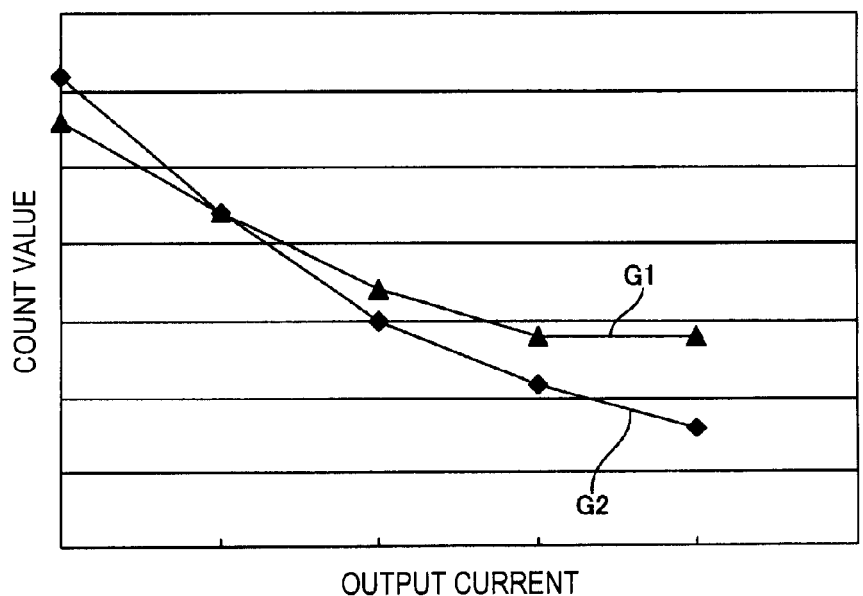
Figure 17A:
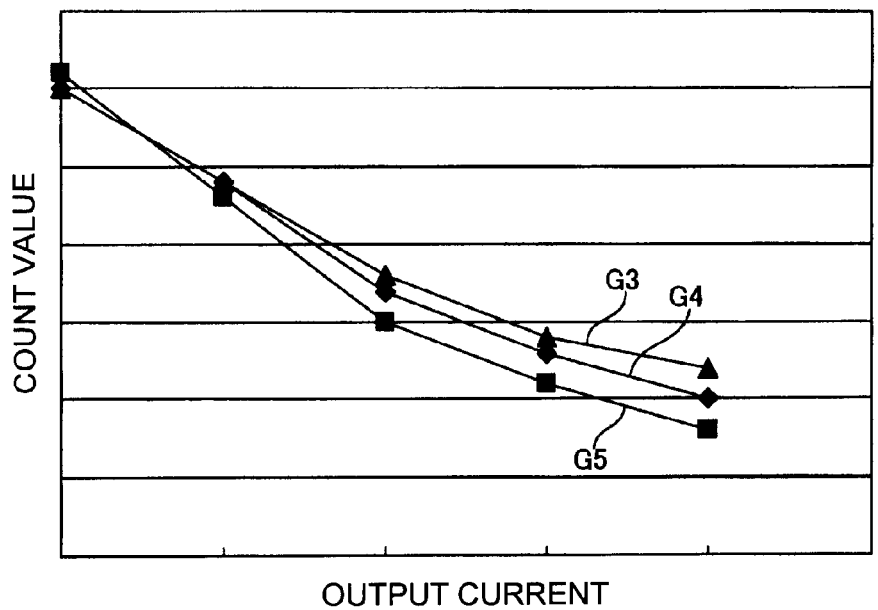
FIGS. 17A and 17B are schematic views explaining the coil parameter.

For example, FIG. 16B shows a measured value showing a relation of a count value of pulse width detection and an output current (a load) when the inductance is adjusted so as to have the same output current. G1 is a measured value of the secondary coil having a smaller coil area while G2 is a measured value of that having a larger coil area. FIG. 17A shows a measured value showing a relation of a count value of pulse width detection and an output current when the inductance is adjusted by the secondary coils having the same outer diameter. G3 is a measured value of the secondary coil having the smallest coil area, G5 is a measured value of that having the largest coil area, and G4 is a measured value of that having a medium coil area.

As shown in FIGS. 16B and 17A, a fluctuation range of the count value of pulse width detection to a load fluctuation becomes smaller when the coil area of the secondary coil is small. Accordingly, when a coil area of the secondary coil is changed in accordance with a size and the like of the electronic apparatus, a threshold and the like are set by considering variability characteristics of the count values of FIGS. 16B and 17A.

Figure 17B:
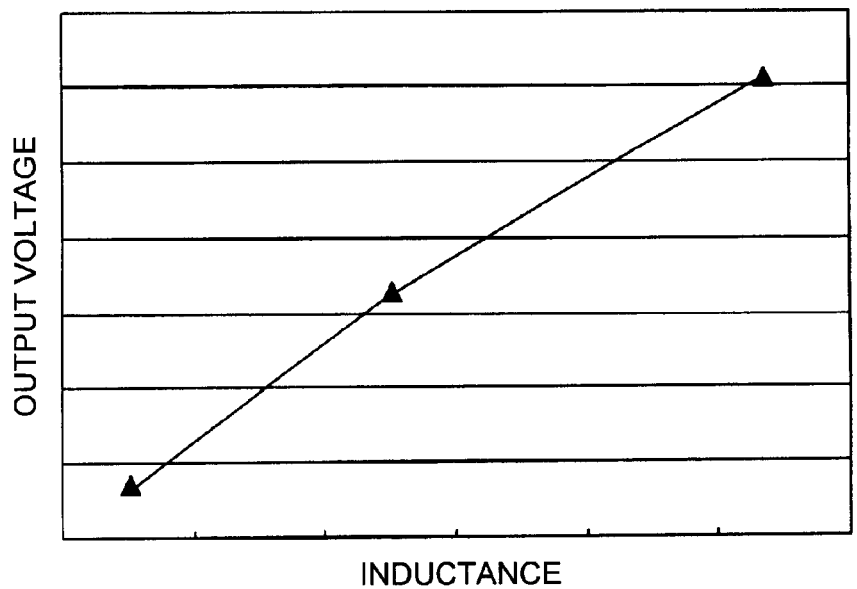

FIG. 17B shows a relation of an inductance and an output voltage with the secondary coils having the same outer diameter. As shown in FIG. 17B, a change in inductance allows an output voltage (a supply voltage VOUT to a load) to be variously changed, increasing output variations of the coil.

As above, the characteristics of threshold and output voltage change in accordance with the coil parameter of the secondary coil. As a result, as shown in FIG. 6 for example, if a plurality of secondary coils having different coil parameters is corresponded to a single primary coil, transmitting information such as a threshold and an output voltage corresponding to the coil parameters from the power receiving side to the power transmission side allows optimally adjusted contactless power transmission to be realized.

While the embodiment has been described in detail above, it will be understood by those skilled in the art that a number of modifications can be made to this embodiment without substantially departing from new matters and advantages of this invention. Therefore, it is to be noted that these modifications are all included in the scope of the invention. For example, terms referred as broader or equivalent terms in the specification and drawings can be replaced with the broader or equivalent terms in any part of the specification and drawings. Further, combinations of the embodiment and the modifications can be included in the scope of the invention. Also, the configurations and the operations of the power transmission control device, the power transmission device, the power receiving control device, and the power receiving device are not limited to what have been described in the embodiment, and various modifications can be made thereto.

What is claimed is:

1. A power transmission control device included in a contactless power transmission system that transmits power by electromagnetically coupling a primary coil from a power transmission device to a secondary coil from a power receiving device to supply the power to a load of the power receiving device, the power transmission control device comprising:
- a controller that controls the power transmission device, the controller including:
- a negotiation processing section that performs a negotiation process of contactless power transmission; and
- a setup processing section that performs a setup process of the contactless power transmission based on a result of the negotiation process,
- the controller exchanging information between the power transmission device and the power receiving device during the negotiation process and the setup process,
- the controller confirming whether or not the information exchanged between the power transmission device and the power receiving device matches with each other,
- the information including at least one of standard information and coil information, and
- the controller executing a normal power transmission from the power transmission device to the power receiving device.

2. The power transmission control device of claim 1, the controller further comprising:
- a command processing section that performs a command process of the contactless power transmission after the setup process, the command process starting the normal power transmission from the power transmission device to the power receiving device.

3. The power transmission control device of claim 2, the command process comprising the execution of a command that is confirmed to be available by at least one of the negotiation process and the setup process.

4. The power transmission control device of claim 3, the command comprising at least one of:
- a command for starting the normal power transmission;
- a command for detecting a full charge of a battery included in the load; and
- a command for confirming whether or not a recharge of the battery is required.

5. The power transmission control device of claim 1, the negotiation process being at least one of:
- a confirmation process that confirms whether or not information can be communicated between the power transmission device and the power receiving device;
- a confirmation process that confirms whether or not the communicated information is adequate;
- a confirmation process that confirms whether or not the load of the power receiving device is appropriate;
- a checking process that checks at least one of standard information and coil information between the power transmission device and the power receiving device; and
- a checking process that checks system information of the power transmission device, the information providing a load condition based on system information of the power receiving device.

6. The power transmission control device of claim 1, the setup process being at least one of:
- a process in which a transmission condition of the power is set based on a result of the negotiation process; and
- a process in which information on a corresponding function between the power transmission device and the power receiving device is exchanged.

7. The power transmission control device of claim 1, under the condition that the power receiving device transmits transmission condition information of the contactless power transmission, the setup process section receives the transmission condition information so as to set a transmission condition of the contactless power transmission.

8. The power transmission control device of claim 1, the controller controlling the power transmission device comprising:
- a process that stops the normal power transmission under the condition that the power receiving device requests a power transmission stop.

9. The power transmission control device of claim 1, the controller controlling the power transmission device comprising:
- a process that stops the normal power transmission from the power transmission device to the power receiving device under the condition that a full charge of a battery included in the load of the power receiving device is detected.

10. The power transmission control device of claim 9, the controller controlling the power transmission device comprising:
- a process that stops normal power transmission in response to detecting a full charge on the power receiving device; and
- a process that places the power transmission device into a standby phase after detecting the full charge.

11. The power transmission control device of claim 10, the controller controlling the power transmission device comprising:
- a process that confirms a recharge of the battery in the standby phase after detecting the full charge.

12. The power transmission control device of claim 11, the controller controlling the power transmission device comprising:
- a process that maintains a flag for confirming a recharge in a set state without clearing the flag in the standby phase after detecting the full charge.

13. The power transmission control device of claim 10, the controller controlling the power transmission device comprising:
- a process that sets the power transmission device into a standby phase after detecting a removal of an electronic apparatus from the power receiving side.

14. The power transmission control device of claim 13, the controller controlling the power transmission device comprising:
- a process that sets the power transmission device into a phase of the negotiation process in response to detecting placement of the electronic apparatus on the power receiving side while the power transmission device is in the standby phase.

15. A power transmission device, comprising:
- the power transmission control device of claim 1; and
- a power transmission section that generates an alternate current voltage to supply the voltage to the primary coil.

16. A power receiving control device included in a contactless power transmission system that transmits power to a power receiving device by electromagnetically coupling a primary coil of a power transmission device with a secondary coil of the power receiving device to supply the power to a load of the power receiving device, the power receiving control device comprising:
- a controller that controls the power receiving device, the controller including:
- a negotiation processing section that performs a negotiation process of contactless power transmission;
- a setup processing section that performs a setup process of the contactless power transmission based on a result of the negotiation process, the controller exchanging information between the power transmission device and the power receiving device during the negotiation process and the setup process, the controller confirming whether or not the information exchanged between the power transmission device and the power receiving device matches with each other, the information including at least one of standard information and coil information, and the controller executing a normal power transmission from the power transmission device to the power receiving device.

17. The power receiving control device of claim 16, the controller further comprising:
   a command processing section that performs a command process after the setup process, the command process starting the normal power transmission from the power transmission device to the power receiving device.

18. The power receiving control device of claim 17, the command process performed by the command processing section comprising the execution of a command that is confirmed to be available by at least one of the negotiation process and the setup process.

19. The power receiving control device of claim 18, the command executed by the command processing section comprising at least one of:
   a command for staring the normal power transmission;
   a command for detecting a full charge of a battery included in the load; and
   a command for confirming whether or not a recharge of the battery is required.

20. The power receiving control device of claim 16, the negotiation process performed by the negotiation processing section comprising at least one of:
   a confirmation process that confirms whether or not information is able to be communicated between the power transmission device and the power receiving device;
   a confirmation process that confirms whether or not the communicated information is adequate;
   a confirmation process that confirms whether or not the load of the power receiving device is appropriate;
   a checking process that checks at least one of standard information and coil information between the power transmission device and the power receiving device; and
   a checking process that checks system information of the power transmission device, the information providing a load condition based on system information of the power receiving device.

21. The power receiving control device of claim 16, the setup process performed by the setup processing section comprising at least one of:
   a process in which a transmission condition of the power is set based on a result of the negotiation process; and
   a process in which information on a corresponding function between the power transmission device and the power receiving device is exchanged.

22. A power receiving device, comprising:
   the power receiving control device of claim 16; and
   a power receiving section that converts an induced voltage of the secondary coil into a direct current voltage.

23. An electronic apparatus, comprising:
   the power receiving device of claim 22; and
   a load to which power is supplied by the power receiving device.

24. A method for controlling power transmission in a contactless power transmission system that transmits power by electromagnetically coupling a first coil from a power transmission device to a second coil from a power receiving device to supply the power to a load of the power receiving device, comprising:
   performing a negotiation process of contactless power transmission;
   performing a setup process of the contactless power transmission based on a result of the negotiation process;
   exchanging information between the power transmission device and the power receiving device during the negotiation process and the setup process;
   confirming whether or not the information exchanged between the power transmission device power receiving device matches with each other; and
   executing a normal power transmission from the power transmission device to the power receiving device after the setup process,
   the information including at least one of standard information and coil information.

25. The method for controlling power transmission of claim 24, further comprising:
   performing a command process of the contactless power transmission after the setup process to start the normal power transmission by the command process.

26. The method for controlling power transmission of claim 24, the negotiation process comprising at least one of:
   a confirmation process that confirms whether or not information is able to be communicated between the power transmission device and the power receiving device;
   a confirmation process that confirms whether or not the communicated information is adequate;
   a confirmation process that confirms whether or not the load of the power receiving device is appropriate;
   a checking process that checks standard information or coil information between the power transmission device and the power receiving device; and
   a checking process that checks system information of the power transmission device, the information showing a method for detecting a load condition, with system information of the power receiving device.

27. The method for controlling power transmission of claim 24, the setup process comprising at least one of:
   a process in which a transmission condition of the power is set based on a result of the negotiation process; and
   a process in which information on a corresponding function between the power transmission device and the power receiving device is exchanged.

28. The method for controlling power transmission claim 24, the command process comprising:
   a command that is confirmed to be available by at least one of the negotiation process and the setup process, is issued and/or executed.

29. The method for controlling power transmission of claim 28, the command process further comprising at least one of:
   a command for staring the normal power transmission;
   a command for detecting a full charge of a battery included in the load; and
   a command for confirming whether or not a recharge of the battery is required.

30. A method for controlling power receiving in a contactless power transmission system that transmits power by electromagnetically coupling a first coil from a power transmission device to a second coil from a power receiving device to supply the power to a load of the power receiving device, comprising:
   performing a negotiation process of contactless power transmission;

performing a setup process of the contactless power transmission based on a result of the negotiation process;

exchanging information between the power transmission device and the power receiving device during the negotiation process and the setup process;

confirming whether or not the information exchanged between power transmission device and the power receiving device matches with each other; and starting a supply of power to the load by starting normal power transmission from the power transmission device to the power receiving device after the setup process, the information including at least one of standard information and coil information.

31. A contactless power transmission system that performs a contactless power transmission, the system comprising:

a power transmission device comprising:

a primary coil that transmits a first data via an electromagnetic coupling, receives a second data via the electromagnetic coupling and transmits the contactless power transmission via the electromagnetic coupling based on the received second data;

a power receiving device comprising:

a secondary coil that receives the first data from the power transmission device via the electromagnetic coupling, transmits the second data to the power transmission device via the electromagnetic coupling and receives the contactless power transmission from the power transmission device via the electromagnetic coupling based on the transmitted second data; and a controller that controls the power transmission device, the controller including:

a negotiation processing section that controls a negotiation process of contactless power transmission with the power receiving device based on an exchange of the first data and the second data; and a setup processing section that performs a setup process of the contactless power transmission based on a result of the negotiation process, the controller exchanging information between the power transmission device and the power receiving device during the negotiation process and the setup process, the controller confirming whether or not the information exchanged between the power transmission device and the power receiving device matches with each other, the information including at least one standard information and coil information, and the controller executing the contactless power transmission from the power transmission device to the receiving device.

32. The contactless power transmission system of claim 31, the power transmission device further comprising:

a power transmission section that generates a first signal on the primary coil having a first frequency to transmit a data value of 1 via the electromagnetic coupling and that generates a second signal on the primary coil having a second frequency to transmit a data value of 0 via the electromagnetic coupling.

33. The contactless power transmission system of claim 32, the power receiving device further comprising:

a frequency detection circuit that detects the first frequency via the secondary coil and the electromagnetic coupling to receive a data value of 1 and that detects the second frequency via the secondary coil and the electromagnetic coupling to receive a data value of 0.

34. The contactless power transmission system of claim 31, the power receiving device further comprising:

a load modulation section that generates a third signal on the secondary coil having a first amplitude to transmit a data value of 1 via the electromagnetic coupling and that generates a fourth signal on the secondary coil having a second amplitude to transmit a data value of 0 via the electromagnetic coupling.

35. The contactless power transmission system of claim 34, the power transmission device further comprising:

a load condition detection circuit that detects the first amplitude via the primary coil and the electromagnetic coupling to receive a data value of 1 and that detects the second amplitude via the primary coil and the electromagnetic coupling to receive a data value of 0.

36. A power transmission control device included in a contactless power transmission system that transmits power by electromagnetically coupling a primary coil from a power transmission device to a secondary coil from a power receiving device to supply the power to a load of the power receiving device, the power transmission control device comprising:

a controller that controls the power transmission device, the controller including:

a negotiation processing section that performs a negotiation process of contactless power transmission;

and a setup processing section that performs a setup process of the contactless power transmission based on a result of the negotiation process, the controller exchanging information between the power transmission device and the power receiving device during the negotiation process and the setup process, the controller confirming whether or not the information exchanged between the power transmission device and the power receiving device matches with each other, the information including safety information, and the controller executing a normal power transmission from the power transmission device to the power receiving device.

* * * * *